(12) United States Patent
Nakagawa et al.

(10) Patent No.: US 6,333,713 B1
(45) Date of Patent: Dec. 25, 2001

(54) DIRECTION ESTIMATING APPARATUS, DIRECTIVITY CONTROLLING ANTENNA APPARATUS, AND DIRECTION ESTIMATING METHOD

(75) Inventors: Youichi Nakagawa; Masahiro Mimura, both of Tokyo; Takaaki Kishigami, Kawasaki; Makoto Hasegawa, Tokyo; Takashi Fukagawa, Kawasaki, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/639,996

(22) Filed: Aug. 17, 2000

(30) Foreign Application Priority Data

Aug. 24, 1999 (JP) .................................................. 11-236732
Aug. 10, 2000 (JP) .................................................. 12-242961

(51) Int. Cl.$^7$ ................................. G01S 3/52; G01S 5/02
(52) U.S. Cl. .......................................... 342/418; 342/417
(58) Field of Search ............................ 34/147, 152, 417, 34/418, 457

(56) References Cited

U.S. PATENT DOCUMENTS

| 3,903,522 | | 9/1975 | Copeland . | |
|---|---|---|---|---|
| 5,317,323 | * | 5/1994 | Kennedy et al. | 342/457 |
| 5,327,143 | | 7/1994 | Goetz et al. . | |
| 5,371,506 | * | 12/1994 | Yu et al. | 342/380 |
| 6,188,913 | * | 2/2001 | Fukagawa et al. | 455/562 |

FOREIGN PATENT DOCUMENTS 0000-65911    3/2000  (JP) .

OTHER PUBLICATIONS

English Language Abstract of JP 2000–65911.
Ralph O. Schmidt, "Multiple Emitter Location and Signal Parameter Estimation"; IEEE Transactions on Antennas and Propagation, vol. AP–34, No. 3, pp. 276–280, Mar. 1986.
Eric M. Dowling et al., "A TQR–Iteration Based Adaptive SVD for Real Time Angle and Frequency Tracking", IEEE Transactions on Signal Processing, vol. 42, No. 4, pp. 914–926, Apr. 1994.

* cited by examiner

*Primary Examiner*—Dao Phan
(74) *Attorney, Agent, or Firm*—Greenblum & Bernstein, P.L.C.

(57) ABSTRACT

Array elements 111-1 to 111-n of array antenna 101 are arranged at respective different heights from a ground so as not to overlap to each other in a vertical direction. Received frequency conversion section 102 converts a radio frequency signal received at each of the array elements 111-1 to 111-n of array antenna 101 into an intermediate frequency signal or baseband signal. A/D conversion section 103 converts an analog signal output from received frequency conversion section 102 into a digital signal using a proper sampling frequency. Direction estimating section 105 estimates directions of an arrival radio signal in a horizontal plane and vertical plane using received digital signals obtained in A/D conversion section 103. It is thereby possible to suppress increases in the number of array elements and computation amount, and to improve estimation accuracy in the vertical direction and resolution at the time a plurality of signals arrive.

17 Claims, 23 Drawing Sheets

DIRECTION ESTIMATING APPARATUS, DIRECTIVITY CONTROLLING ANTENNA APPARATUS, AND DIRECTION ESTIMATING METHOD

BACKGROUND OF THE INVENTION

1. Field of the Invention

The present invention relates to a direction estimating apparatus and method that estimate a direction of an arrival radio signal using an array antenna, and to a directivity controlling antenna apparatus that controls directivity of the array antenna variably based on the estimated result.

2. Description of the Related Art

As techniques that improve communication qualities and frequency channel capacity, attention is recently drawn to antenna directivity controlling techniques that change an antenna directivity dynamically corresponding to propagation environments. A representative example of the antenna directivity controlling techniques is an adaptive array employing an array antenna and digital signal processing.

The adaptive array generally analyzes digital signals received at the array antenna based on some known information, and thereby obtains weights for array elements to form a radiation pattern. One of the known information is a direction of an arrival radio signal. When a direction of a desired signal and that of an interfering signal are known, control is performed to point a beam of the radiation pattern of the array antenna to the direction of the desired signal, and to point a null to the a direction of the interfering signal, whereby it is possible to improve communication qualities.

Meanwhile the technique for estimating a direction of an arrival radio signal is also attractive to detect a position of a communication terminal in a base station. This technique can be used in assigning dynamic channels using spatial traffic information, and further is considered to be applied to an apparatus for supervising unlicensed signals.

An example of methods for estimating a direction of an arrival radio signal with high accuracy from received signals at an array antenna is a subspace-based method represented by a MUSIC (MUltiple SIgnal Classification). The subspace-based method employs eigen vectors of a covariance matrix obtained from complex digital signals received at an array antenna. The details of the MUSIC method is described in "Multiple Emitter Location and Signal Parameter Estimation", R. O. Schmidt, IEEE Trans. AP-34, 3, 1986.

Further proposed method is, for example, a TQR-SVD (Transposed QR-Singular Value Decomposition) that updates eigen vectors sequentially to adapt to a rapid change in propagation environment in a mobile communication. The details of the TQR-SVD method is described in E. M.Dowling, L. P. Ammann, R. D. DeGoat, "A TQR-Iteration Based Adaptive SVD for Real Time Angle and Frequency Tracking", IEEE Trans, SP-42, 4, 1994.

In the case where a direction of an arrival radio signal is estimated using an array antenna, estimation accuracy and resolution at the time a plurality of signals arrival is dependent on, for example, the number of array elements composing the array antenna, a radiation pattern of each array element, and spatial positional relationship between arranged array elements.

It is general to arrange array elements in the form of a circle to estimate a direction of an arrival signal in a horizontal plane. When array elements are arranged on a plane, it is possible to estimate directions of the arrival signal not only in the horizontal plane but also in a vertical plane. In particular, it is possible to improve estimation accuracy in the vertical plane by arranging circular arrays in the vertical direction so as to pile up a plurality of steps, thereby making a cylindrical form as an entire structure.

However piling up the circular arrays in the vertical direction to be the plurality of steps increases the number of array elements, thereby provides a disadvantage in production cost, and further increases a computation amount for signal processing because inputs are increased.

SUMMARY OF THE INVENTION

It is an object of the present invention to provide a direction estimating apparatus and method which suppress increases in the number of array elements and computation amount and which enable improved estimation accuracy in a vertical plane and improved resolution at the time a plurality of signals arrive, in estimating directions of an arrival radio signal in a horizontal plane and in the vertical plane, and further to provide a directivity controlling antenna apparatus that controls radiation beam patterns of an array antenna variably using direction estimated results.

The present invention achieves the above object by arranging a plurality of antennas composing the array antenna at respective different heights from a ground so as not to overlap to each other in the vertical direction.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described specifically below with reference to drawings.

(First Embodiment)

Figure 1:
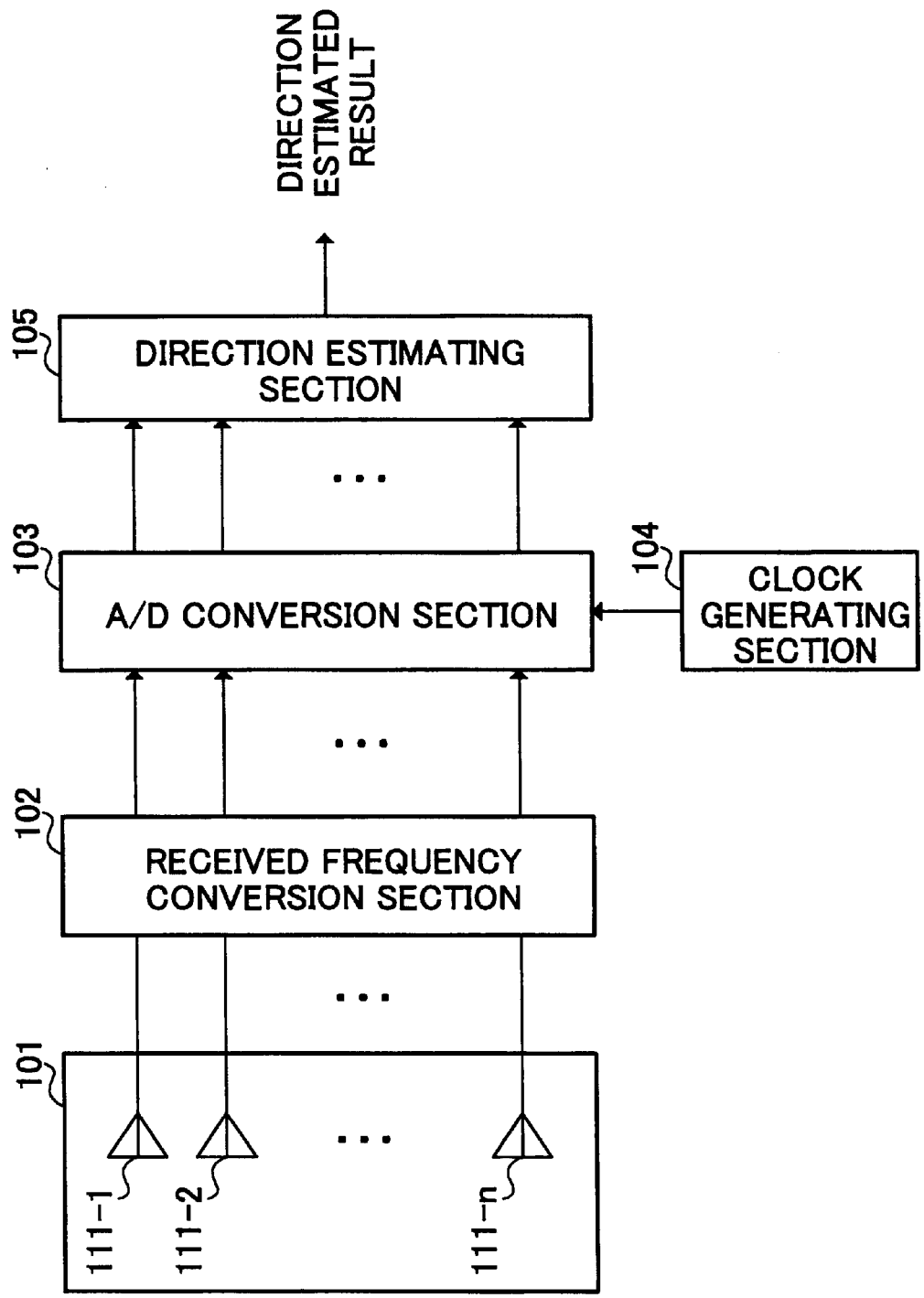
FIG. 1 is a block diagram illustrating a configuration of a direction estimating apparatus in a first embodiment of the present invention.

FIG. 1 is a block diagram illustrating a configuration of a direction estimating apparatus in the first embodiment of the present invention. The direction estimating apparatus illustrated in FIG. 1 is mainly comprised of array antenna 101, received frequency conversion section 102, A/D conversion section 103 and direction estimating section 105. Array antenna 101 is comprised of n (n is a natural number equal to or more than 2) array elements 111-1 to 111-n. An arranged position of each of array elements 111-1 to 111-n in array antenna 101 is described later.

Received frequency conversion section 102 converts a respective radio frequency signal received at each of array elements 111-1 to 111-n of array antenna 101 into a respective intermediate frequency signal or baseband signal.

A/D conversion section 103 converts an analog signal output from received frequency conversion section 102 into a digital signal using a proper sampling frequency.

Clock generating section 104 generates a clock with the sampling frequency to provide to A/D conversion section 103. In addition, in the present invention, as the clock frequency generated in clock generating section 104, either of fixed or varied frequency is available.

Direction estimating section 105 estimates directions of an incoming radio signal in a horizontal plane and vertical plane using received digital signals obtained in A/D conversion section 103.

The following explains about arrangement of array elements of array antenna 101 and a direction estimating procedure in direction estimating section 105. In addition, it is assumed in the following explanation that $\phi$ is indicative of an angle in the range of 0° to 360° (0 to $2\pi$ rad) in the horizontal direction, and $\theta$ is indicative of an angle in the range of $-90°$ to $90°$ ($-\pi/2$ to $-\pi/2$ rad) in the vertical direction.

In the direction estimation, using a super resolution algorithm such as the MUSIC method enables highly accurate estimation of a direction of arrival of a received signal. The MUSIC method, called a subspace-based method, calculates a covariance matrix from received signals of an array antenna, and using eigen vectors of the covariance matrix, estimates the direction of arrival.

Assuming that a received signal of an array antenna comprised of M elements is X, a covariance matrix $R_{XX}$ is obtained with the equation (1) shown below.

$$R_{XX} = \overline{XX^H} \quad (1)$$

where X is a matrix having as elements respective received signals at array elements, H is indicative of complex conjugate transposition, and – is indicative of mean. When the number of arrival signals is S, M eigen vectors of the covariance matrix $R_{XX}$ is divided into S subspace vectors $E_S$ belonging to a signal space, and (M–S) subspace vectors $E_N$ belonging to a noise space. The following equation (2) expresses a steering vector $A(\phi,\theta)$ for array antenna 101 with respect to directions $(\phi,\theta)$ of the arrival signals.

$$A(\phi,\theta) = [a_1(\phi,\theta), \ldots, a_m(\phi,\theta), \ldots, a_M(\phi,\theta)]^T \quad (2)$$

wherein m is a natural number of 1 to M, $a_m(\phi,\theta)$ is a steering vector for each array element, and T is indicative of transposition. At this point, in the direction $(\phi 0, \theta 0)$ of an arrival radio signal, $E_N$ and $A(\phi 0, \theta 0)$ are orthogonalized to each other. Using this property, an directional evaluation function $F(\phi,\theta)$ is expressed with the equation (3) shown below.

$$F(\phi,\theta) = \{A^H(\phi,\theta) \times E_N \times E_N^H \times A(\phi,\theta)\}^{-1} \quad (3)$$

Then scanning $(\phi,\theta)$ detects a peak at $F(\phi 0, \theta 0)$.

While calculation methods of the covariance matrix $R_{XX}$, eigen vectors $E_N$ of a noise space, and directional evaluation function $F(\phi,\theta)$ are not dependent on the arranged positions of the array elements of array antenna 101, the steering vector $A(\phi,\theta)$ is dependent on spatial arranged positions of the array elements of array antenna 101.

Figure 2:
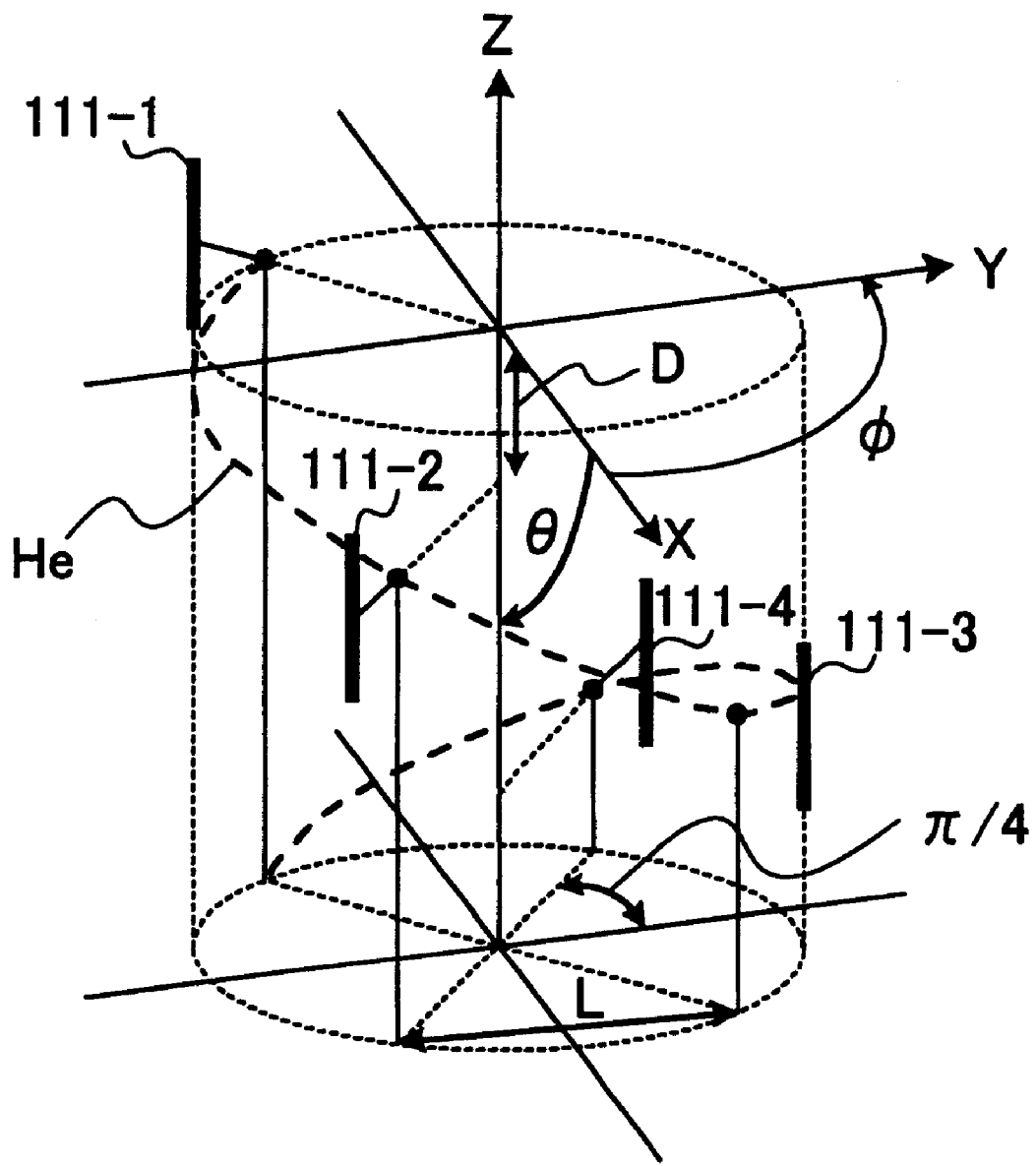
FIG. 2 is a diagram illustrating a configuration of an array antenna in the first embodiment of the present invention.

FIG. 2 is a perspective view illustrating an example of arranged positions of the array elements in this embodiment when the number of array elements is 4. In FIG. 2, X, Y and Z each is an orthogonal axis, L is a distance between neighboring array elements on a horizontal plane, and D is a distance between neighboring array elements in the vertical direction.

Then in FIG. 2, array elements 111-1 to 111-4 are arranged on a side surface of a right circular cylinder so that distance intervals on the horizontal plane are $L(L>0)$, and concurrently distance intervals in the vertical direction are $D(D>0)$. In other words, the array antenna elements 111-1 to 111-4 are arranged on a helix He.

Figure 3A:
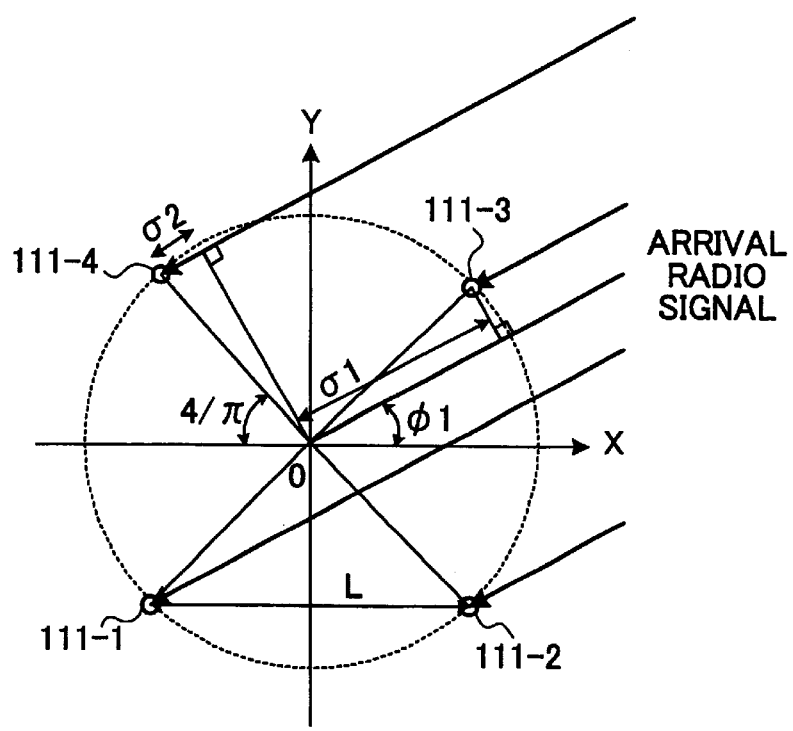
FIG. 3A illustrates diagrams to explain path differences between array elements when arrival radio signals are assumed to be plane waves in the first embodiment of the present invention.
Figure 3B:
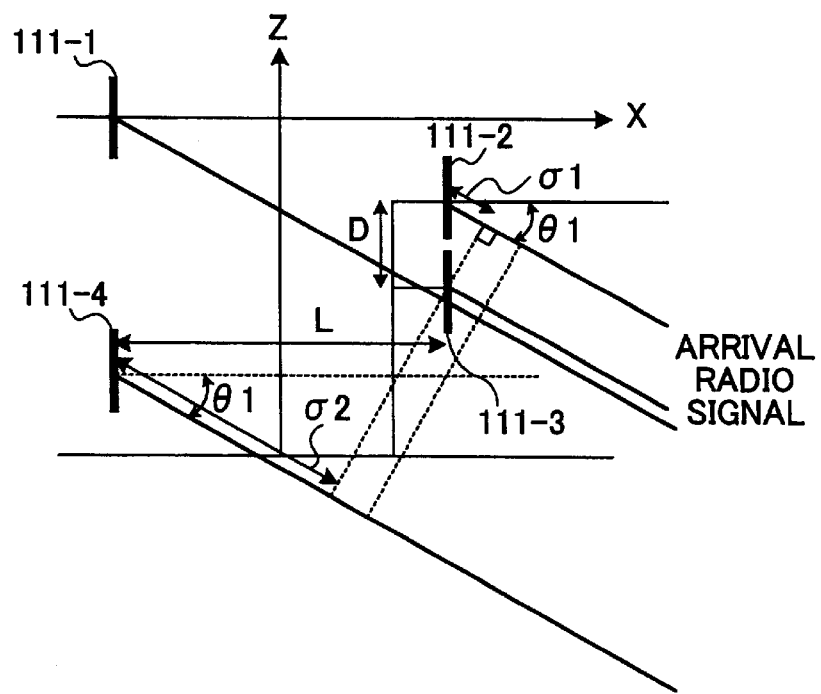
FIG. 3B illustrates diagrams to explain path differences between array elements when arrival radio signals are assumed to be plane waves in the first embodiment of the present invention.

The following explains about the steering vector $A(\phi,\theta)$ of array antenna 101 in the case of FIG. 2. FIG. 3A and FIG. 3B illustrate diagrams to explain path differences between array elements when arrival radio signals are assumed to be plane waves in the case of FIG. 2. FIG. 3A illustrates an XY plane when a direction $(\phi,\theta)$ of an arrival radio signal is $(\phi_1,0)$. The array elements 111-1 to 111-4 are arranged at equal intervals of element distance L in the form of a circle, and a center of the circle is a coordinate origin. When arrival radio signals are assumed to be plane waves, path differences at array elements 111-3 and 111-4 are respectively $\sigma 1$ and $\sigma 2$ with respect to the coordinate origin. When it is assumed that $\phi=0$ in the X axis direction, the path differences $\sigma 1$ and $\sigma 2$ are obtained with the equation (4) shown below. In addition, the path differences $\sigma 1$ and $\sigma 2$ are normalized with a wave length of the arrival radio signal.

$$\sigma 1 = \frac{L}{2\sin(\pi/4)}\cos(\phi 1 - \pi/4), \quad (4)$$

$$\sigma 2 = \frac{L}{2\sin(\pi/4)}\cos(\phi 1 - 3\pi/4)$$

FIG. 3B is a diagram illustrating an XZ plane when the direction $(\phi,\theta)$ of the arrival radio signal is $(0,\theta_1)$. The array elements are arranged with element distances D in the vertical direction. Relative path differences at array elements 111-2 and 111-4 are respectively $\delta 1$ and $\delta 2$ with respect to array element 111-3. When it is assumed that $\theta=0$ in the X axis direction, the path differences $\delta 1$ and $\delta 2$ are obtained with the equation (5) shown below. In addition, the path differences $\delta 1$ and $\delta 2$ are normalized with the wave length of the arrival radio signal.

$$\delta 1 = -D \sin \theta 1, \quad \delta 2 = D \sin \theta 1 - L \cos \theta 1 \quad (5)$$

Thus the relative path difference at each of the array elements with respect to the coordinate origin is obtained. Therefore when the number of array elements is 4, the steering vector $A(\phi,\theta)$ of array antenna 101 is obtained with the equation (6) shown below.

$$A(\phi,\theta)=[a_1(\phi,\theta), a_2(\phi,\theta), a_3(\phi,\theta), a_4(\phi,\theta)]^T \quad (6)$$

$$a_1(\phi, \theta) = \exp\left[2\pi\left\{-\frac{L}{2\sin(\pi/4)}\cos(\phi - \pi/4)\cos\theta\right\}\right]$$

$$a_2(\phi, \theta) = \exp\left[2\pi\left\{D\sin\theta - \frac{L}{2\sin(\pi/4)}\cos(\phi - 3\pi/4)\cos\theta\right\}\right]$$

-continued $$a_3(\phi, \theta) = \exp\left[2\pi\left\{2D\sin\theta - \frac{L}{2\sin(\pi/4)}\cos(\phi - 5\pi/4)\cos\theta\right\}\right]$$

$$a_4(\phi, \theta) = \exp\left[2\pi\left\{3D\sin\theta - \frac{L}{2\sin(\pi/4)}\cos(\phi - 7\pi/4)\cos\theta\right\}\right]$$

Figure 4A:
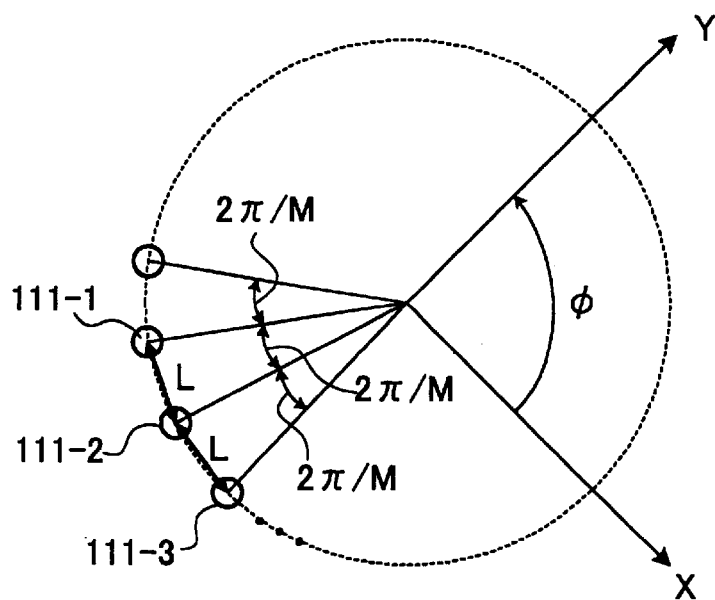
FIG. 4A is a diagram illustrating another configuration of an array antenna in the first embodiment of the present invention.
Figure 4B:
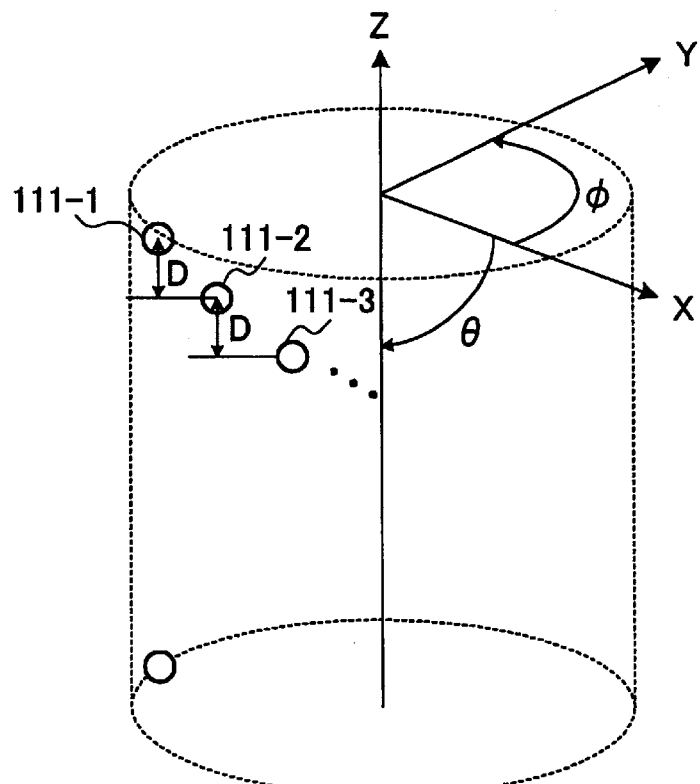
FIG. 4B is a diagram illustrating another configuration of an array antenna in the first embodiment of the present invention.

FIG. 4A and FIG. 4B illustrate diagrams of another example of arranged positions of array elements in this embodiment in the case where the number of array elements is M. FIG. 4A is an XY plane, and FIG. 4B is a perspective view. In the case where the number of array elements is M as illustrated in FIG. 4, the steering vector $A(\phi,\theta)$ is obtained with the equation (7) shown below.

$$A(\phi,\theta)=[a_1(\phi,\theta), \ldots, a_m(\phi,\theta), \ldots, a_M(\phi,\theta)]^T \quad (7)$$

$$a_m(\phi, \theta) = \exp\left[2\pi\left\{(m-1)D\sin\theta - \frac{L}{2\sin(\pi/4)}\cos(\phi - (2m-1)\pi/M)\cos\theta\right\}\right]$$

Accordingly by using the steering vector $A(\phi,\theta)$, it is possible to estimate directions of an arrival radio signal using the MUSIC method.

Figure 5A:
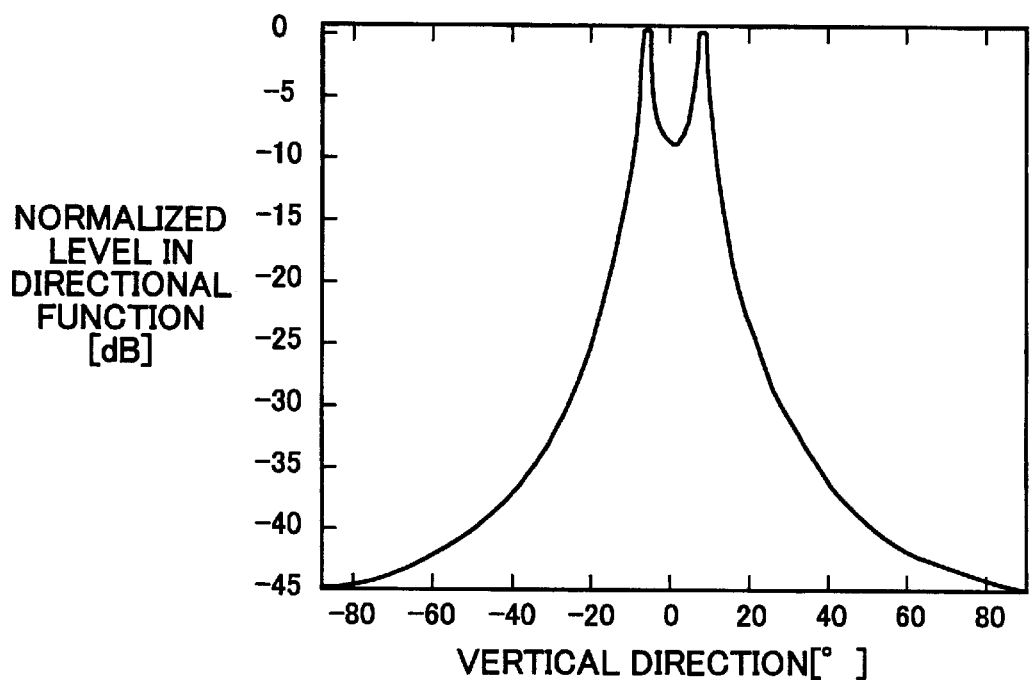
FIG. 5A is a first diagram to explain the operation of an azimuth estimating section in the first embodiment of the present invention.
Figure 5B:
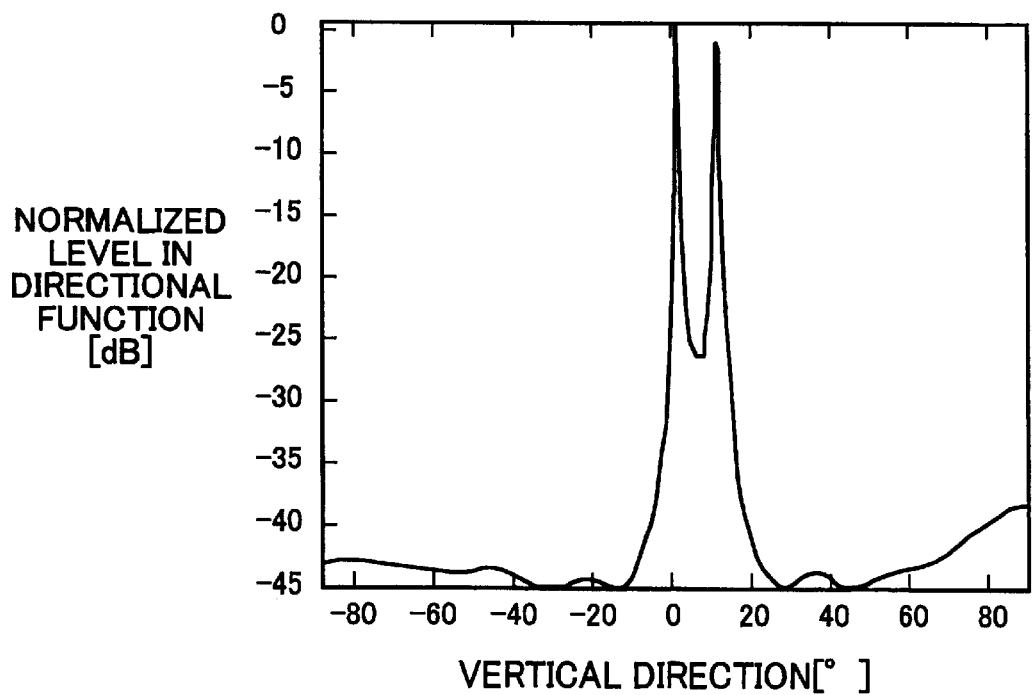
FIG. 5B is a first diagram to explain the operation of an azimuth estimating section in the first embodiment of the present invention.

FIG. 5A and FIG. 5B are diagrams illustrating direction estimated results in the vertical direction when the number of array elements is 5, and direction estimating section 105 uses the MUSIC method as an estimation algorithm. FIG. 5A illustrates a result in the case of using a circular array such that the array elements of array antenna 101 are arranged on the same plane in the form of a circle. FIG. 5B illustrates another result in the case where the array elements of array antenna 101 are arranged on a helix. In each of FIGS. 5A and 5B, an abscissa is indicative of the vertical direction, and an ordinate is indicative of normalized level in the directional evaluation function. Further each of FIGS. 5A and 5B illustrates a case that two arrival radio signals (P,Q) are present.

As can be seen from comparison between FIGS. 5A and 5B, FIG. 5B has a lower normalized level K of the evaluation function at a point between the two arrival radio signals (around 0° in the vertical direction), and it is understood that arranging array elements on a helix improves the resolution.

Figure 6:
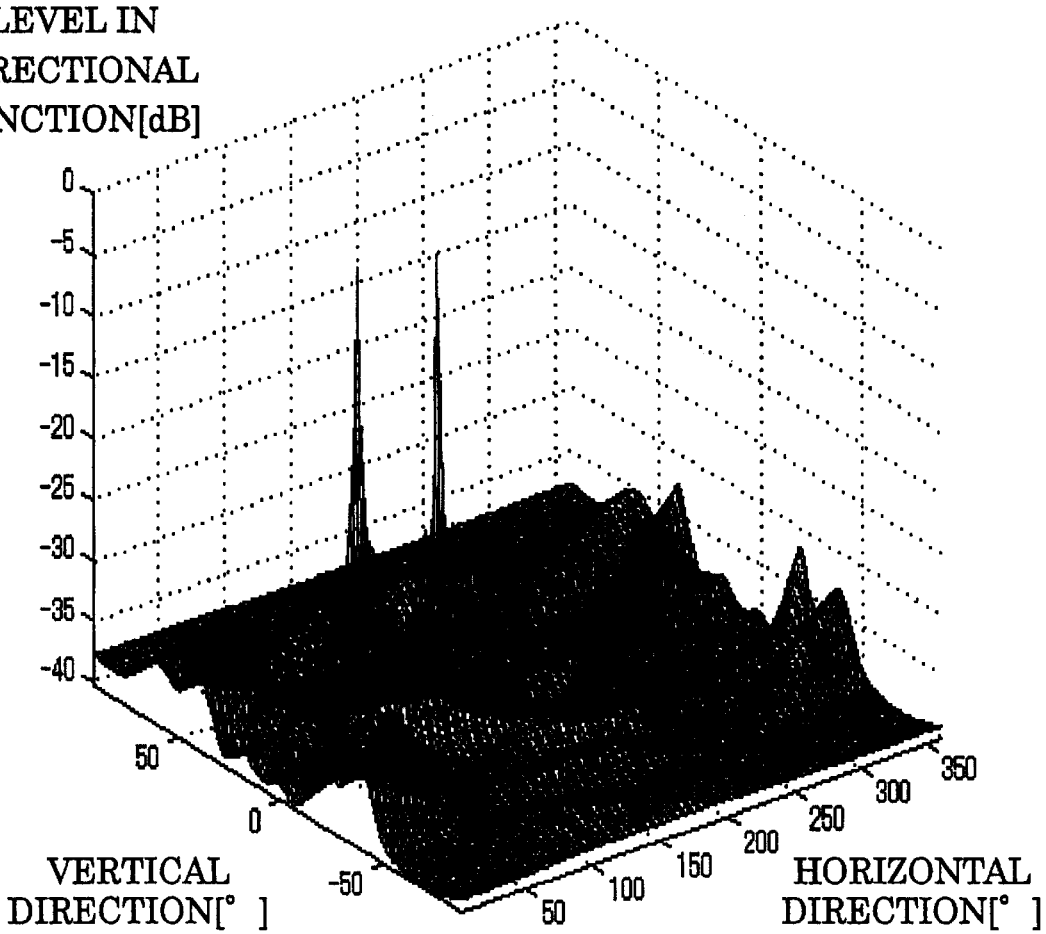
FIG. 6 is a second diagram to explain the operation of the azimuth estimating section in the first embodiment of the present invention.

FIG. 6 is a diagram illustrating direction estimated results in the horizontal direction $\phi$ and vertical direction $\theta$ when the number of array elements is 5, the array elements are arranged on the helix, and direction estimating section 105 uses the MUSIC method as the estimation algorithm. As can be seen from FIG. 6, it is possible to perform direction estimation with high resolution in the horizontal direction $\phi$ and vertical direction $\theta$ by arranging the array elements on the helix, and using the MUSIC method as the estimation algorithm.

In addition, in order to compare with a generally used array antenna such that the array elements are arranged at equal intervals in the form of a circle on a horizontal plane, this embodiment explains the case where the array elements are arranged on the helix so that the array elements are arranged in the form of a circle on the horizontal plane. Further the present invention enables direction estimation with high resolution in the horizontal direction $\phi$ and vertical direction $\theta$ by arranging array elements at respective different heights from a ground so as not to overlap to each other in the vertical direction.

In addition, it is possible to hold uniform accuracy in horizontal direction direction of an arrival radio signal by arranging array elements on a helix so that the array elements are arranged in the form of a circular on a horizontal plane.

(Second Embodiment)

Figure 7:
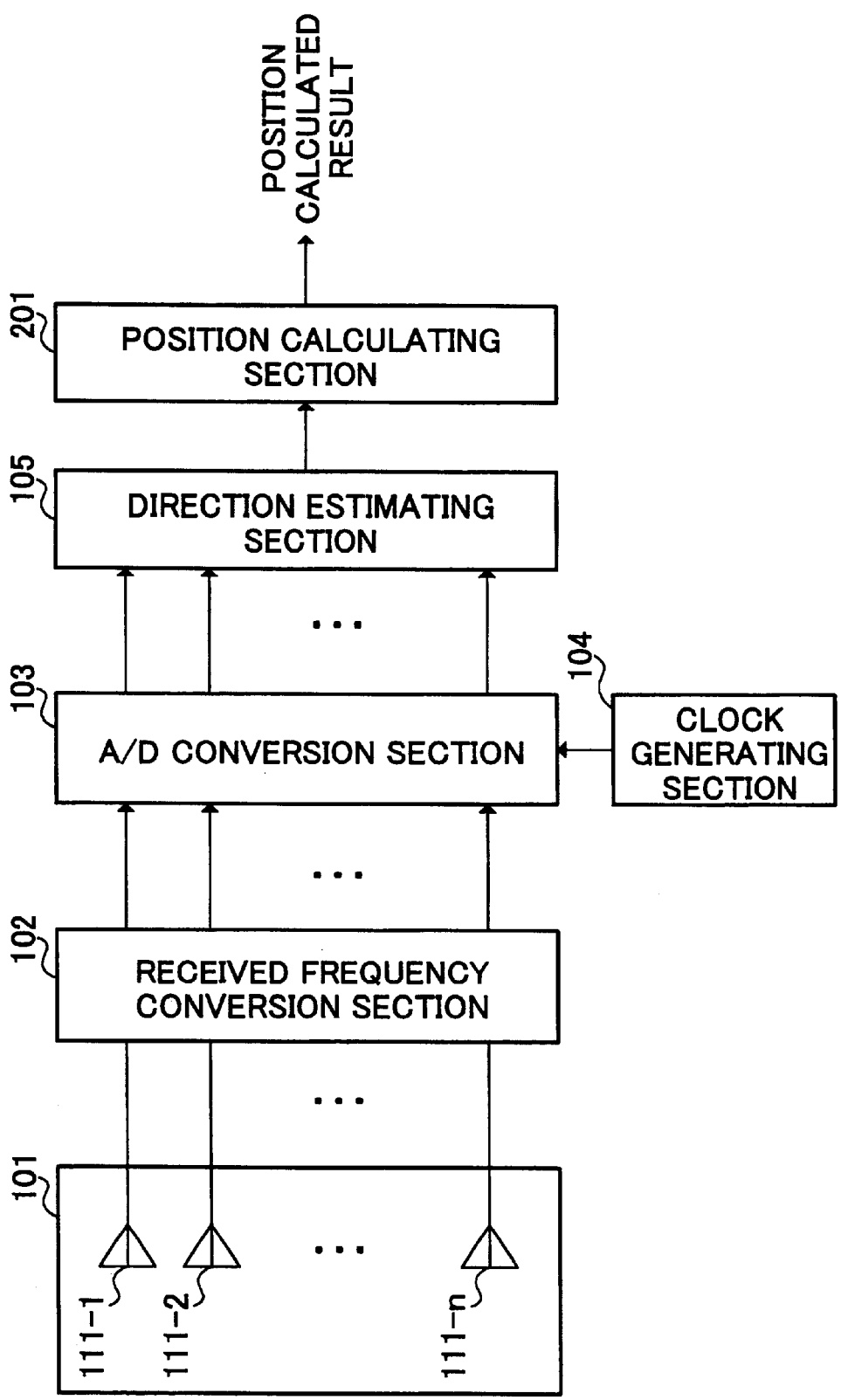
FIG. 7 is a diagram illustrating a configuration of an azimuth estimating apparatus in a second embodiment of the present invention.

Second embodiment explains a case that a position of a transmission source is calculated using direction estimated results obtained with a method explained in the first embodiment. FIG. 7 is a block diagram illustrating a configuration of a direction estimating apparatus in this embodiment. In addition, in the direction estimating apparatus illustrated in FIG. 7, sections common to those in the direction estimating apparatus illustrated in FIG. 1 are assigned the same marks as those in FIG. 1, and explanations thereof are omitted.

The direction estimating apparatus illustrated in FIG. 7 has position calculating section 201 in addition to configuration of the direction estimating apparatus illustrated in FIG. 1. Direction estimating section 105 estimates directions of an incoming radio signal in the horizontal direction and vertical direction using received digital signals obtained in A/D conversion section 103, and outputs direction estimated results to position calculating section 201.

Figure 8:
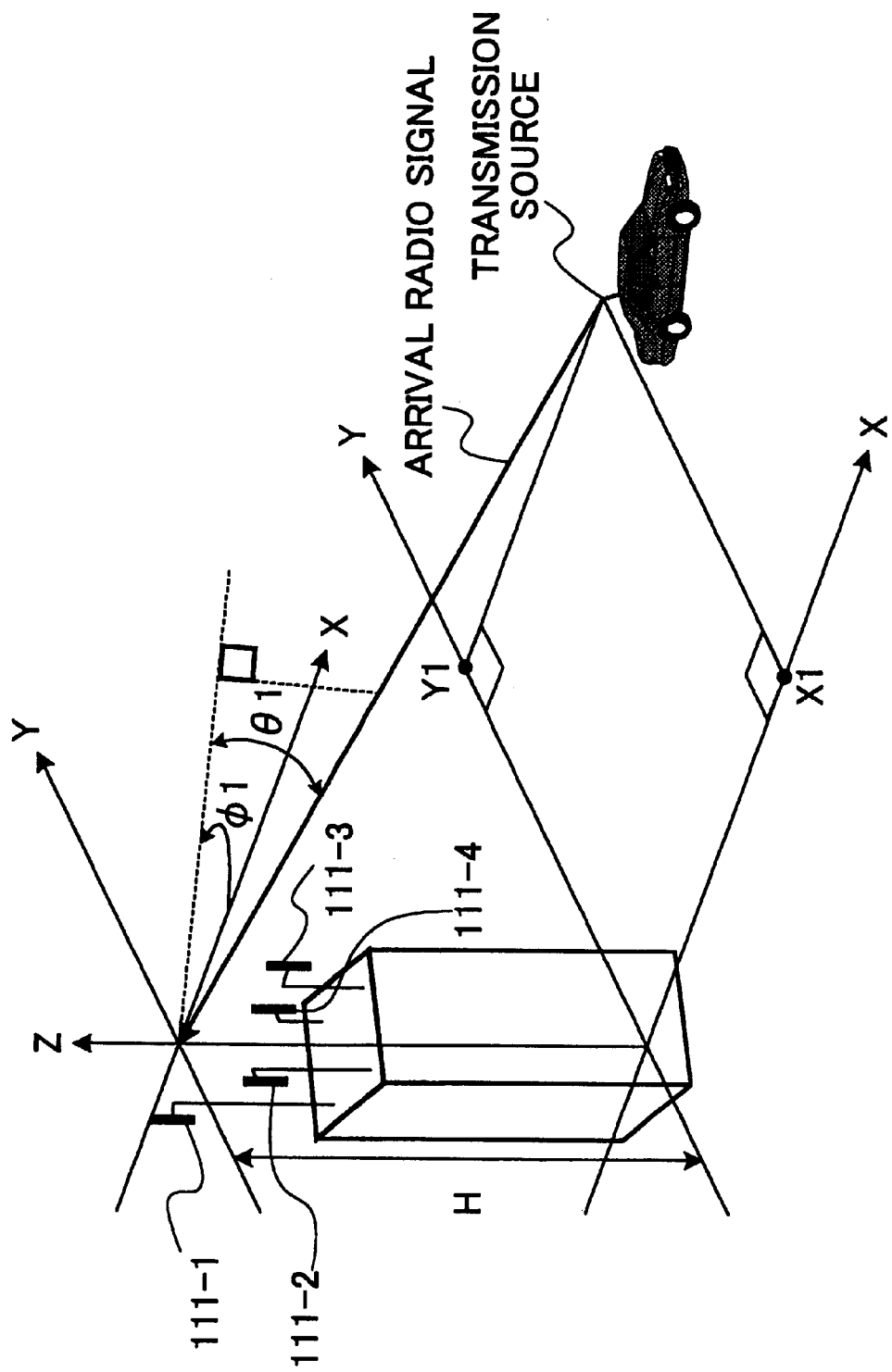
FIG. 8 is a diagram to explain the operation of a position calculating section in the second embodiment of the present invention.

Position calculating section 201 calculates a position of a transmission source using the direction estimated results and a height of array antenna 101. FIG. 8 is a diagram illustrating one example of methods for calculating a position in position calculating section 201. In FIG. 8, H is the height of array antenna 101. As illustrated in FIG. 8, when a transmission source is present at a constant height from a ground where the transmission source is positioned like an antenna of a vehicle moving on a road, it is possible to obtain a distance R between a coordinate origin and the transmission source with the equation (8) shown below.

$$R = H/\tan\theta_1 \qquad (8)$$

Then position calculating section 201 is capable of specifying the position of the transmission source with R and $\phi_1$.

Thus having position calculating section 201 that calculates a position of a transmission source enables calculation of the position of the transmission source using the direction estimated results and the height H of array antenna 101.

In addition, a method is conventionally known that calculates a position of a transmission-side apparatus based on a propagation delay that is a difference between a signal transmitted time at the transmission-side apparatus and a signal received time at a reception-side apparatus. However the propagation delay of radio signals is extremely small, and the propagation environment varies due to effects of fading and noises in radio communications, whereby a measurement error in the propagation delay is large, and therefore the accuracy is limited in this method. In contrast to this, the present invention estimates directions of an arrival radio signal in the horizontal direction and vertical direction, calculates a position of a transmission source based on the estimated results, and therefore provides high accuracy.

(Third Embodiment)

Direction estimation accuracy sometimes deteriorates largely when a radio signal arrives from a specific direction, depending on a positional relationship between arranged array elements. For example, when the number of array elements is 4 as illustrated in FIG. 2, the direction estimation accuracy deteriorates largely in $(\phi,\theta)=(0°,0°)$, $(90°,0°)$, $(180°,0°)$ and $(270°,0°)$.

To solve this problem, the third embodiment explains a case that array elements are arranged so as to prevent deterioration of the estimation accuracy with respect to an arrival radio signal from a specific direction. In addition in this embodiment, a configuration of an entire apparatus is the same as that in FIG. 1, and therefore the explanation thereof is omitted.

Figure 9:
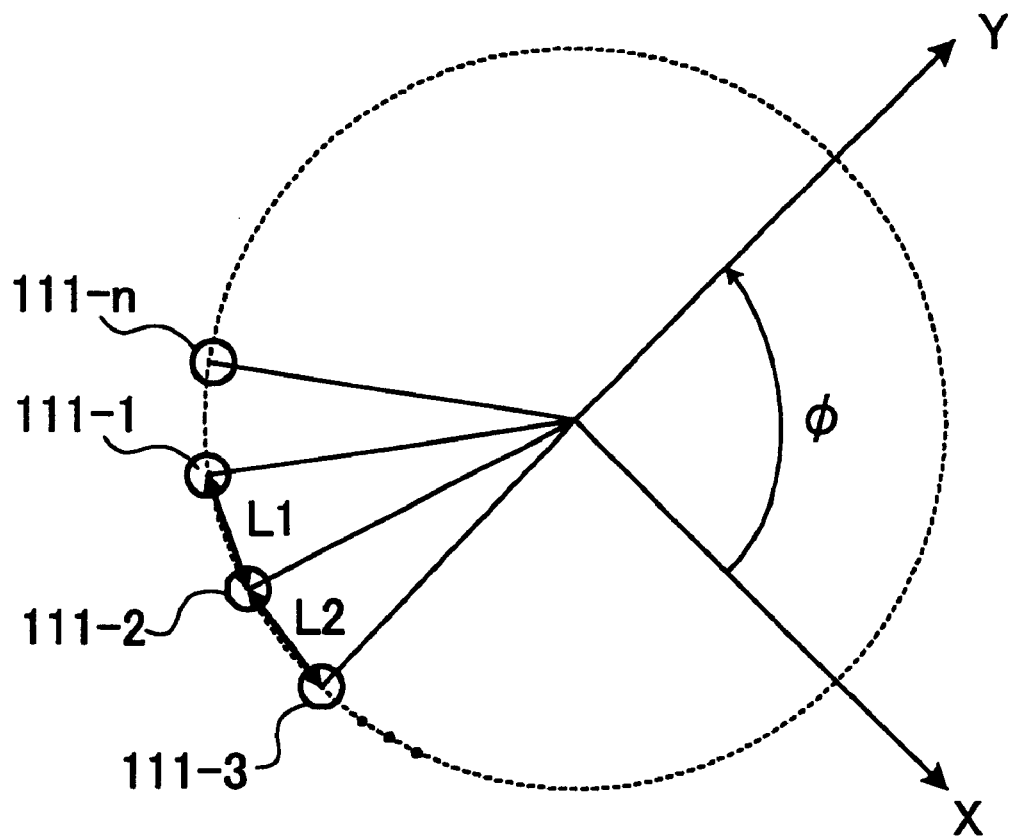
FIG. 9 is a diagram illustrating a configuration of an array antenna in a third embodiment of the present invention.

FIG. 9 is an XY plane illustrating one example of arranged positions of array elements in this embodiment. In FIG. 9, L1 and L2 are distances between neighboring array elements on a horizontal plane. In addition it is assumed that L1≠L2. In this embodiment, the array elements of array antenna 101 are arranged on a helix so that distance intervals between neighboring array elements are ununiform on the horizontal plane.

Figure 10A:
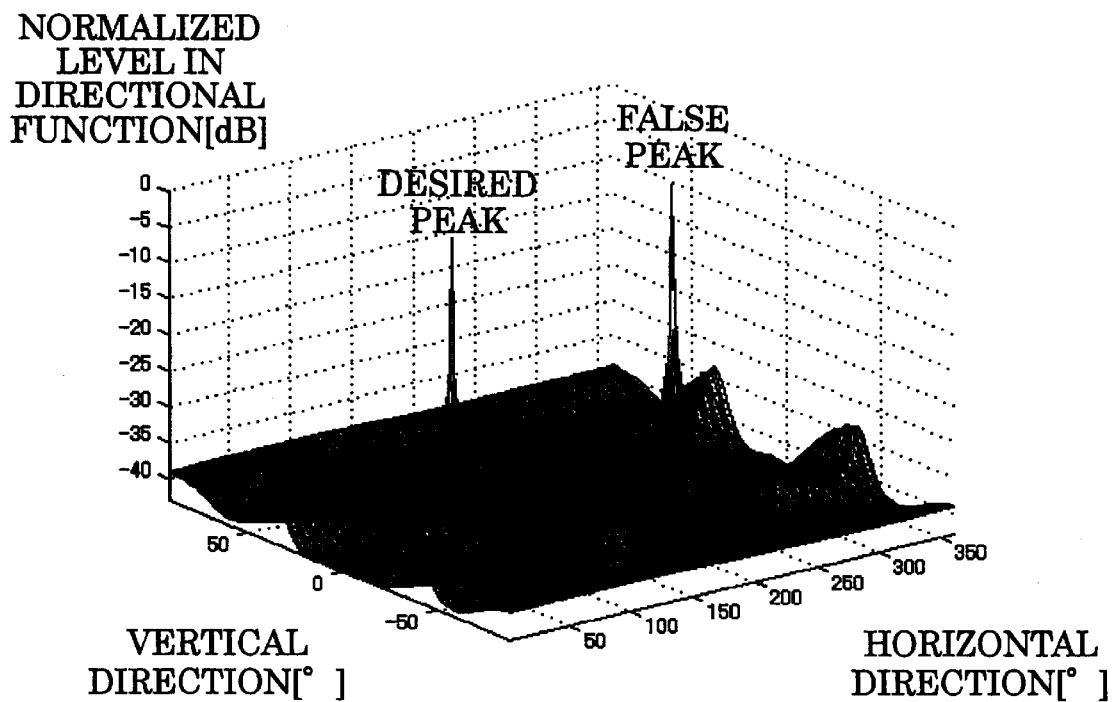
FIG. 10A is a diagram to explain the operation of an azimuth estimating section in the third embodiment of the present invention.
Figure 10B:
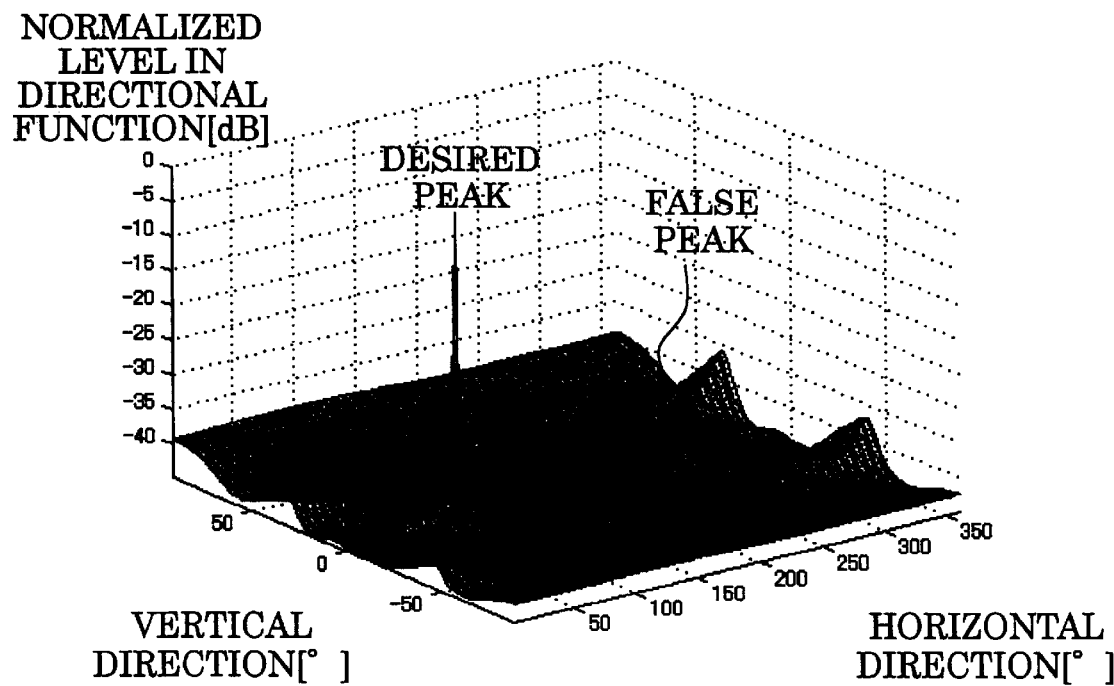
FIG. 10B is a diagram to explain the operation of an azimuth estimating section in the third embodiment of the present invention.

FIGS. 10A and 10B are diagrams illustrating direction estimated results in the case of using 4 array elements, and using the MUSIC method as an estimation algorithm in direction estimating section 105. FIG. 10A is a diagram illustrating direction estimated results in the case of arranging the array elements so that the distance intervals between neighboring array elements are constant on the horizontal plane. FIG. 10B is a diagram illustrating another direction estimating results in the case of arranging the array elements on a helix so that the distance intervals between neighboring array elements are ununiform on the horizontal plane. Further each of FIGS. 10A and 10B illustrates the case that a directional evaluation function $F(\phi,\theta)$ of an actual arrival radio signal is $(90°,0°)$.

As illustrated in FIG. 10A, when the array elements are arranged so that the distance intervals between neighboring array elements are constant on the horizontal plane, a false peak is generated in addition to a peak at a desired direction in the directional evaluation function $F(\phi,\theta)$. In contrast to this, as illustrated in FIG. 10B, when the array elements are arranged on the helix so that the distance intervals between neighboring array elements are ununiform on the horizontal plane, a level of the false peak is decreased, thereby enabling improved direction estimation accuracy.

By thus arranging the array elements so that the distance intervals between neighboring array elements are ununiform on the horizontal plane, it is possible to prevent deterioration of the estimation accuracy with respect to an arrival radio signal from a specific direction. This condition is effective in particular when the number of array elements of an array antenna is a small number.

(Fourth Embodiment)

The fourth embodiment explains about a directivity controlling antenna apparatus which is provided with an direction estimating apparatus according to the first embodiment, and which performs directional combining in reception using direction estimated results obtained in direction estimating section 105.

Figure 11:
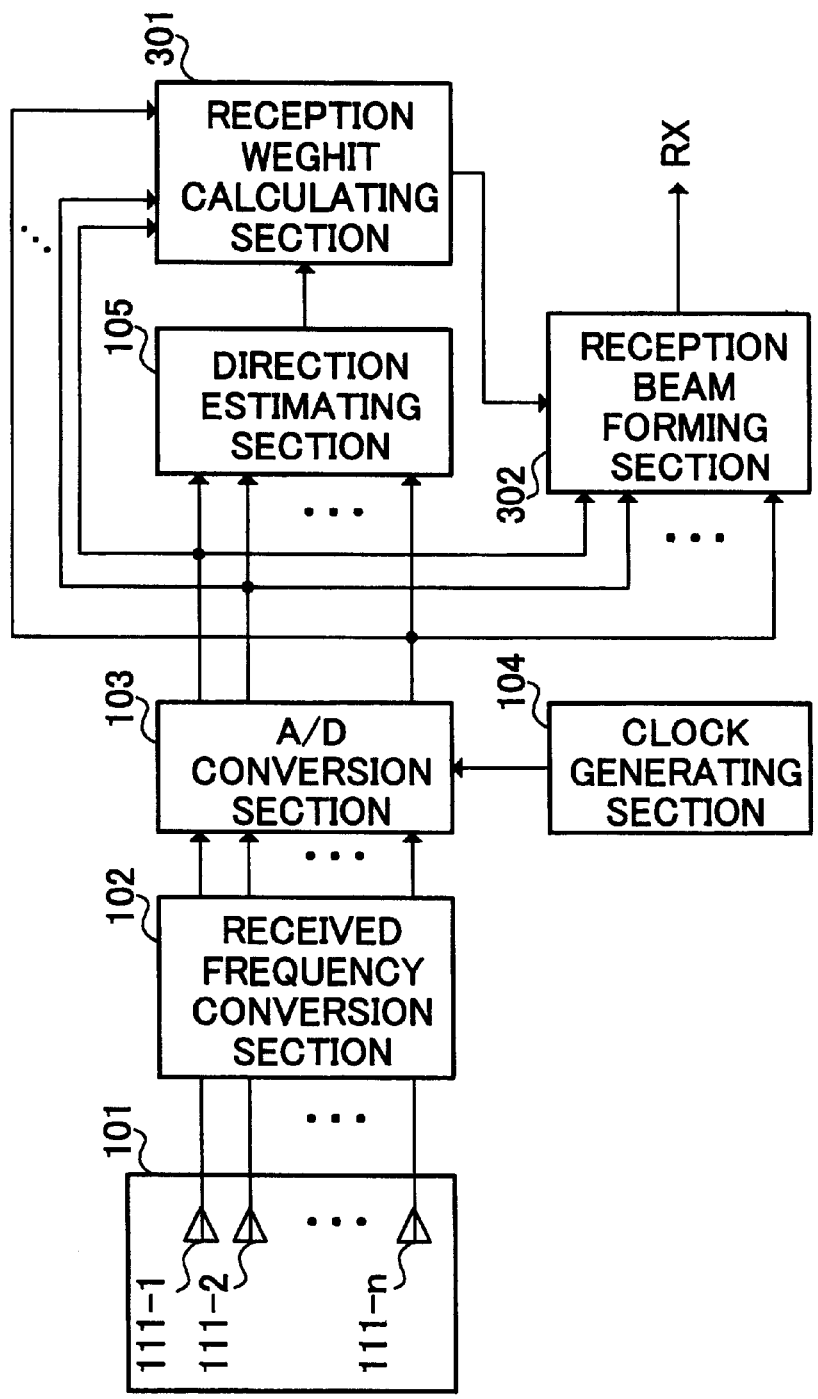
FIG. 11 is a block diagram illustrating a configuration of a directivity controlling antenna apparatus in a fourth embodiment of the present invention.

FIG. 11 is a block diagram illustrating a configuration of a directivity controlling antenna apparatus in this embodiment. In addition in the directivity controlling antenna apparatus illustrated in FIG. 11, sections common to those in the direction estimating apparatus illustrated in FIG. 1 are assigned the same marks as those in FIG. 1, and explanations thereof are omitted.

The directivity controlling antenna apparatus illustrated in FIG. 11 has reception weight calculating section 301 and reception beam forming section 302 in addition to the configuration of the direction estimating apparatus illustrated in FIG. 1.

Reception weight calculating section 301 obtains reception weights to control an amplitude and phase of a received signal at each array element of array antenna 101, using received digital signals output from A/D conversion section 103 and the direction estimated results output from direction estimating section 105.

Reception beam forming section 302 performs directional combining for array antenna 101 on received digital signals output from A/D conversion section 103 using the reception weights, and outputs a desired received digital signal RX.

At this point, it is possible to improve reception sensitivity by controlling a radiation pattern so that a peak thereof is formed in the direction of a desired signal, and a null thereof is formed in the direction of an interfering signal.

(Fifth Embodiment)

The fifth embodiment explains about a directivity controlling antenna apparatus which is provided with an direction estimating apparatus according to the first embodiment, and which performs directional combining in transmission and reception using direction estimated results obtained in direction estimating section 105.

Figure 12:
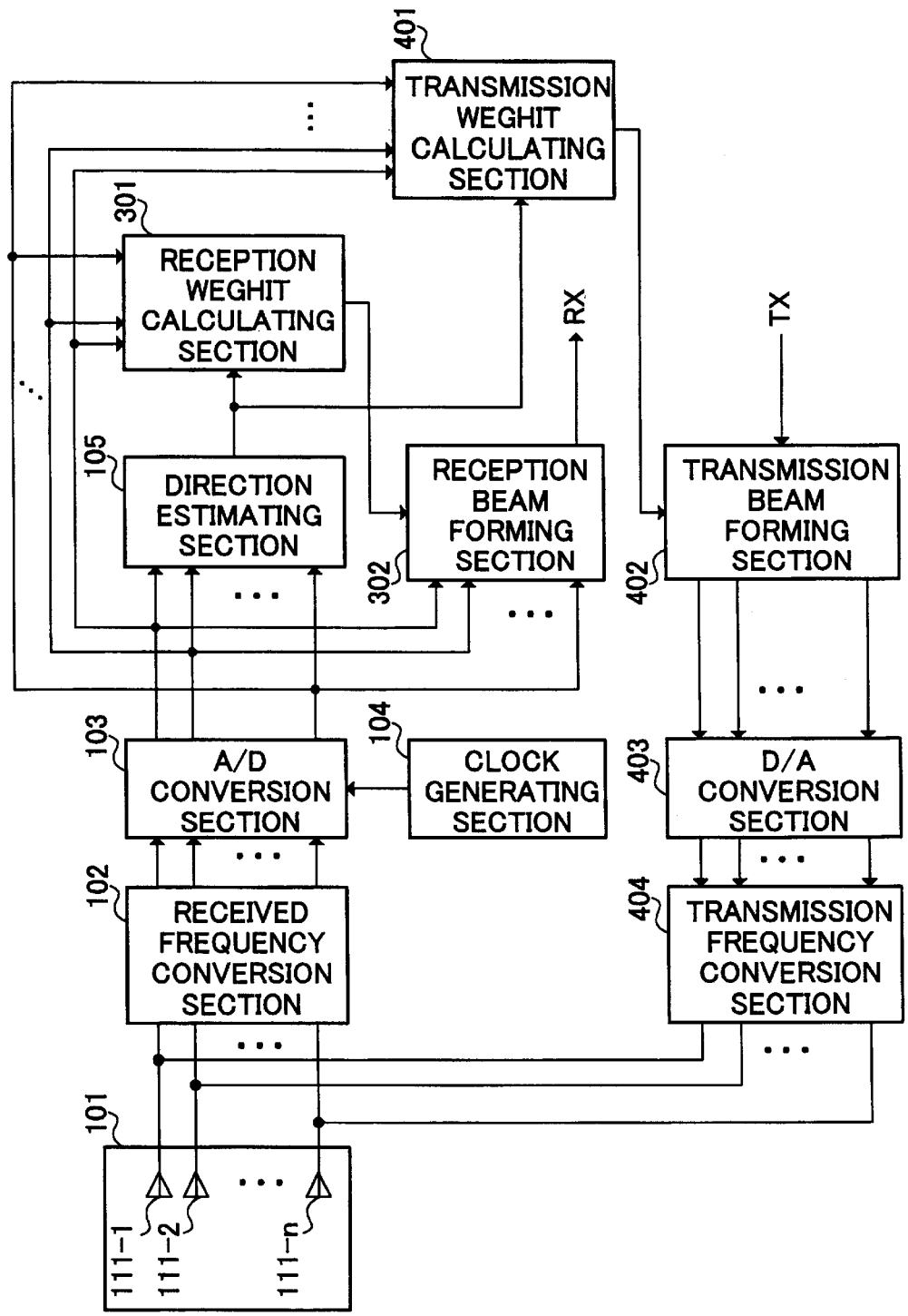
FIG. 12 is a first block diagram illustrating a configuration of a directivity controlling antenna apparatus in a fifth embodiment of the present invention.

FIG. 12 is a block diagram illustrating a first configuration of the directivity controlling apparatus according to this embodiment. In addition in the directivity controlling antenna apparatus illustrated in FIG. 12, sections common to those in the directivity controlling antenna apparatus illustrated in FIG. 11 are assigned the same marks as those in FIG. 11, and explanations thereof are omitted.

The directivity controlling antenna apparatus illustrated in FIG. 12 has transmission weight calculating section 401, transmission beam forming section 402, D/A conversion section 403 and transmission frequency conversion section 404 in addition to the configuration of the directivity controlling antenna apparatus illustrated in FIG. 12.

Transmission weight calculating section 401 obtains transmission weights to control an amplitude and phase of a signal to be transmitted from each array element of array antenna 101, using received digital signals output from A/D conversion section 103 and the direction estimated results output from direction estimating section 105.

Transmission beam forming section 402 performs directivity control of array antenna 101 on transmission digital signals using the transmission weights.

In this case, it is possible to improve communication qualities by controlling a radiation pattern so that a peak thereof is formed in the direction of a desired signal, and a null thereof is formed in the direction of an interfering signal.

D/A conversion section 403 converts an output signal from transmission beam forming section 402 into an analog transmission intermediate frequency signal or baseband signal. Transmission frequency conversion section 404 converts the intermediate frequency signal or baseband signal output from D/A conversion section 403 into a radio frequency signal, and the resultant radio signal is transmitted from the array antenna.

Figure 13:
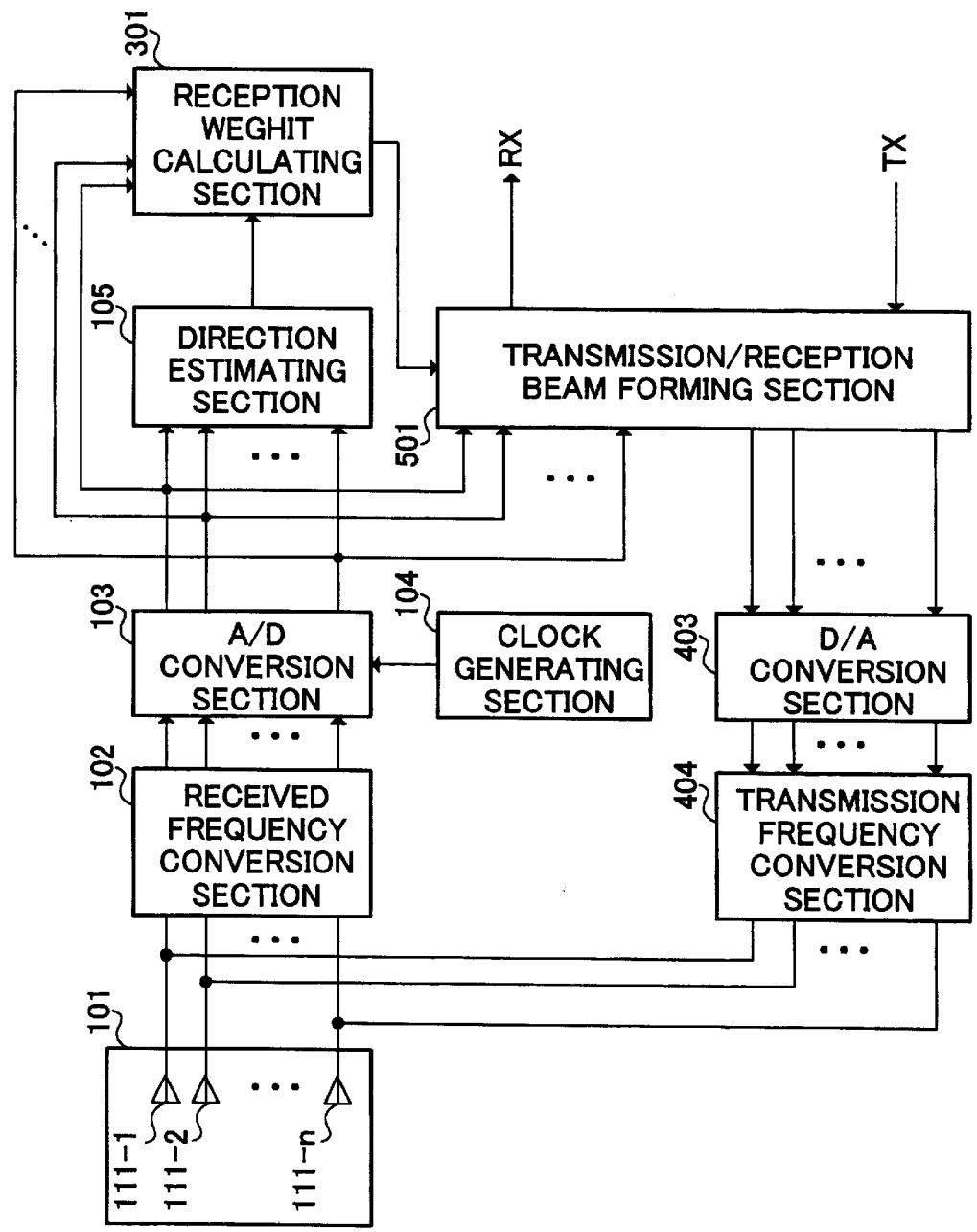
FIG. 13 is a second block diagram illustrating a configuration of another directivity controlling antenna apparatus in the fifth embodiment of the present invention.

Further as illustrated in FIG. 13, it may be possible that a directivity controlling antenna apparatus is provided with transmission/reception beam forming section 501 that operates as reception beam forming section 302 and transmission beam forming section 402. In this case, transmission/reception beam forming section 501 performs directional combining for array antenna 101 on received digital signals output from A/D conversion section 103 using reception weights, and outputs a desired received digital signal. Further transmission/reception beam forming section 501 performs directivity control of array antenna 101 on transmission digital signals using the reception weights. This configuration does not require transmission weight calculating section 401, whereby it is possible to reduce a computation amount and miniaturize the apparatus.

Figure 14:
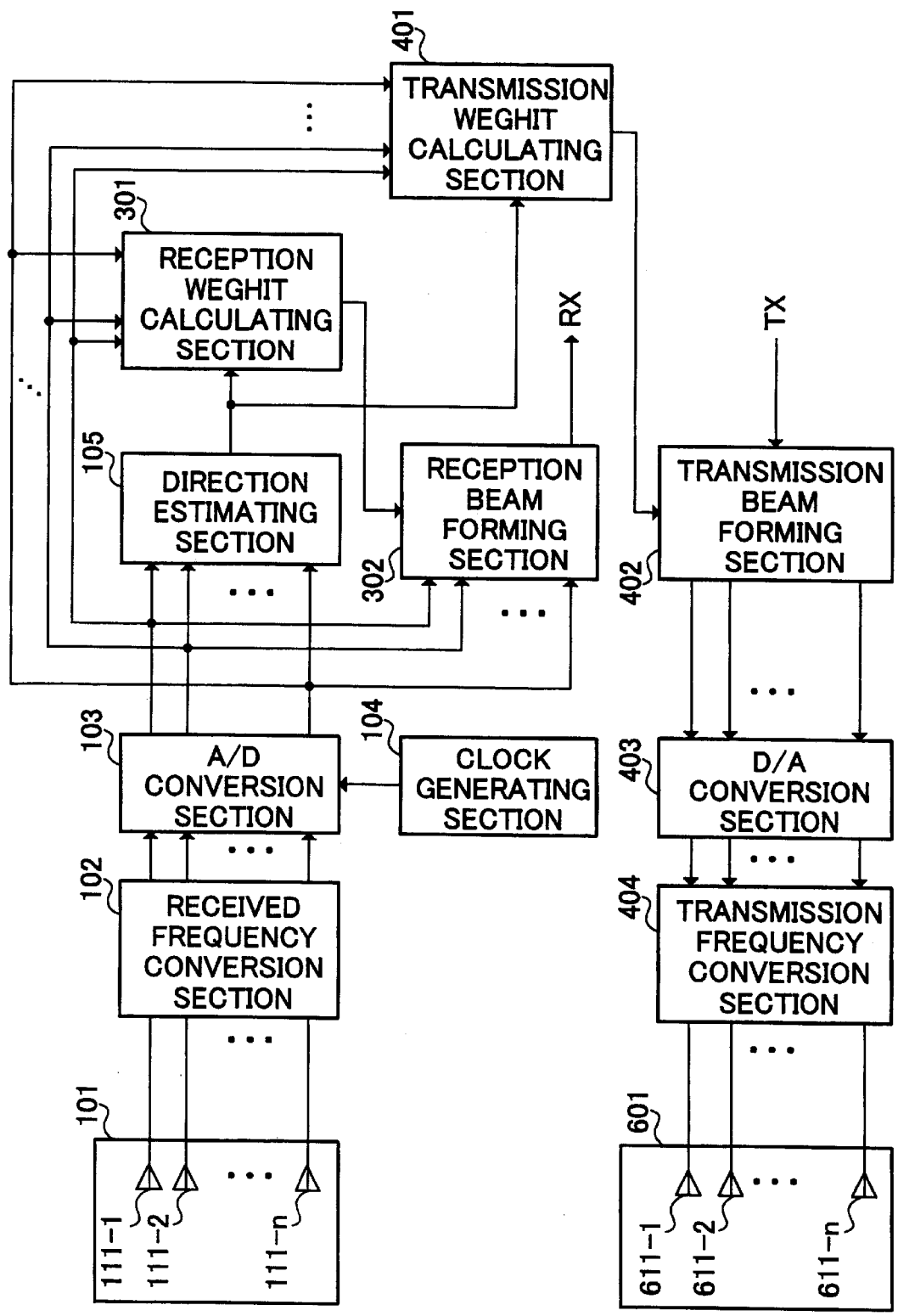
FIG. 14 is a third block diagram illustrating a configuration of the other directivity controlling antenna apparatus in the fifth embodiment of the present invention.

Furthermore as illustrated in FIG. 14, it may be possible that a directivity controlling antenna apparatus is provided with transmission array antenna 601 comprised of m array elements 611-1 to 611-m separately from array antenna 101 comprised of n(n<m) array elements, so that transmission array antenna 601 transmits a radio frequency signal output from transmission frequency conversion section 404. In this case, since it is possible to sharpen a radiation beam pattern in the direction of a desired signal in transmitting the signal, it is possible to reduce power consumption at a reception-side apparatus.

(Sixth Embodiment)

Figure 15:
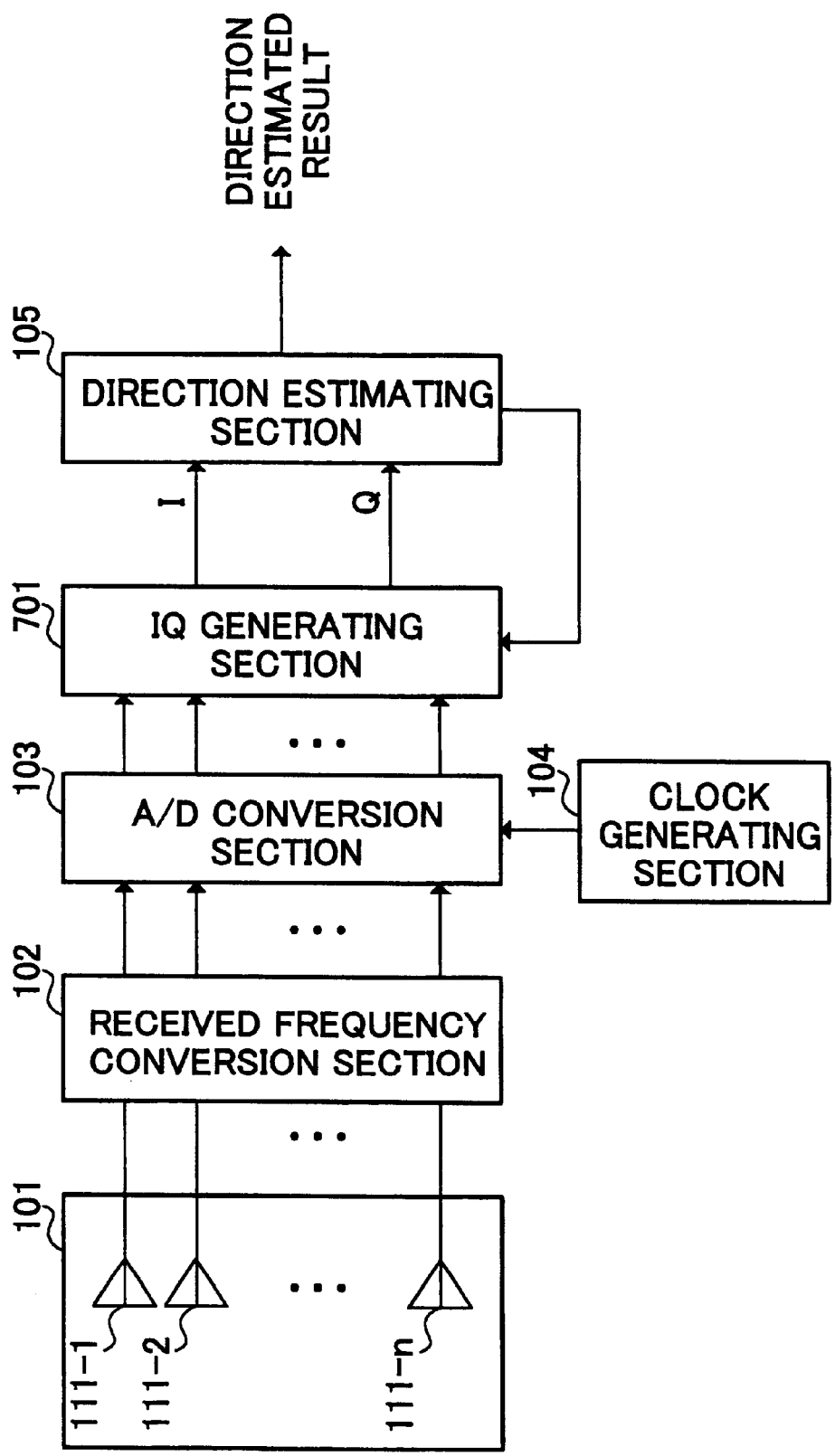
FIG. 15 is a block diagram illustrating a configuration of an azimuth estimating apparatus in a sixth embodiment of the present invention.

FIG. 15 is a block diagram illustrating a configuration of a direction estimating apparatus according to the sixth embodiment of the present invention. In addition in the direction estimating apparatus illustrated in FIG. 15, sections common to those in the direction estimating apparatus illustrated in FIG. 1 are assigned the same marks as those in FIG. 1, and explanation thereof are omitted.

The direction estimating apparatus illustrated in FIG. 15 has IQ generating section 701 in addition to the configuration of the direction estimating apparatus illustrated in FIG. 1.

A/D conversion section 103 converts an analog output signal from received frequency conversion section 102 into a digital signal using a proper sampling frequency to output to IQ generating section 701.

IQ generating section 701 generates an in-phase component signal (hereinafter referred to as I signal) and a quadrature component signal (hereinafter referred to as Q signal) intermittently and a periodically, using a received digital signal obtained in A/D conversion section 103, based on instruction from direction estimating section 105. In addition a specific method is described later that generates the I signal and Q signal in IQ generating section 701.

Direction estimating section 105 estimates a direction of arrival of a received radio signal using the I signal and Q signal output from IQ generating section 701. At this point, it is possible for direction estimating section 105 to estimate the direction of arrival of the received radio signal with high accuracy using a super resolution algorithm such as the MUSIC method. Further direction estimating section 105 instructs output timings of the I signal and Q signal to IQ generating section 701.

Figure 16:
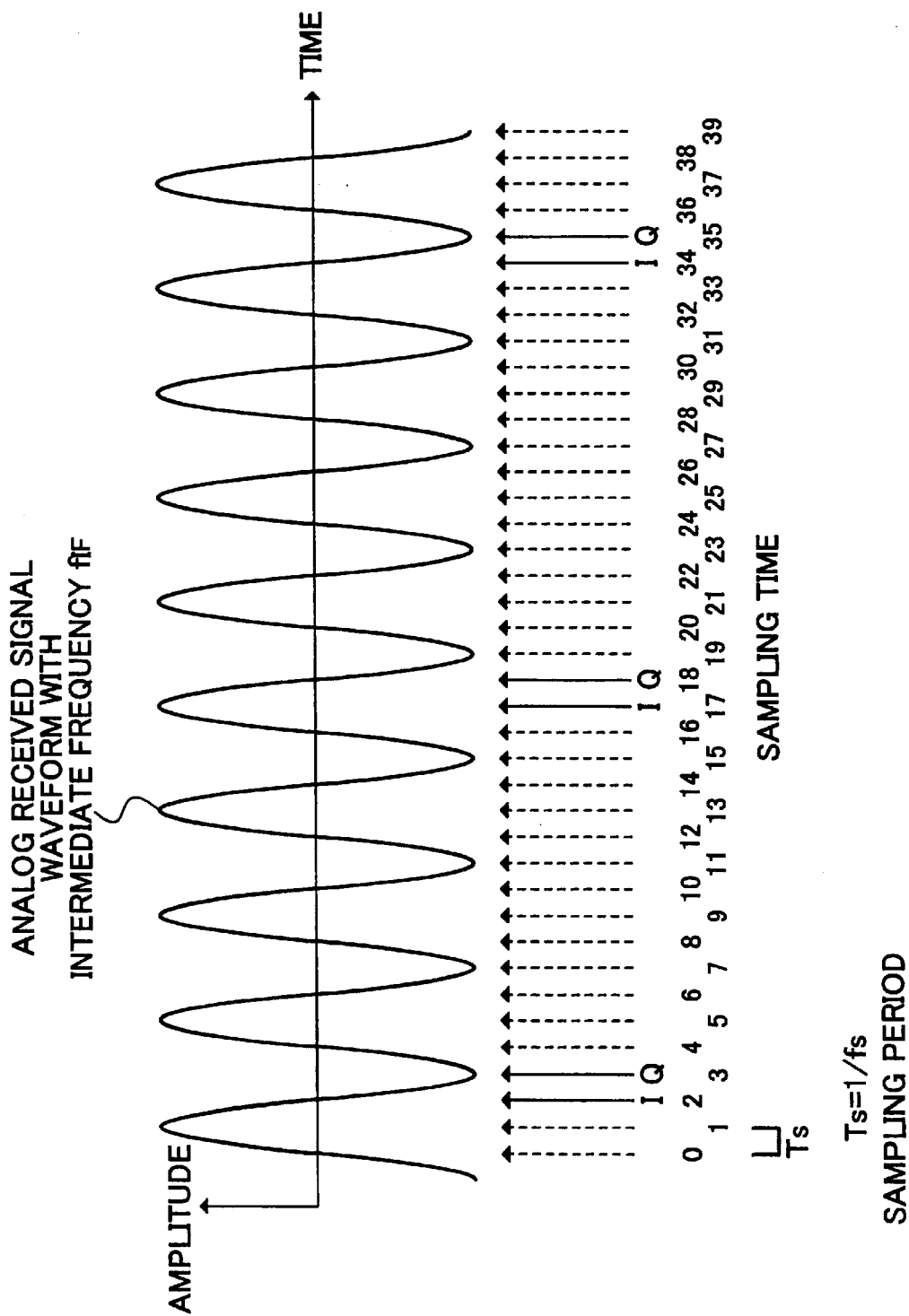
FIG. 16 is a first diagram to explain a method of generating an I signal and Q signal in an IQ generating section in the azimuth estimating apparatus in the sixth embodiment of the present invention.
Figure 17:
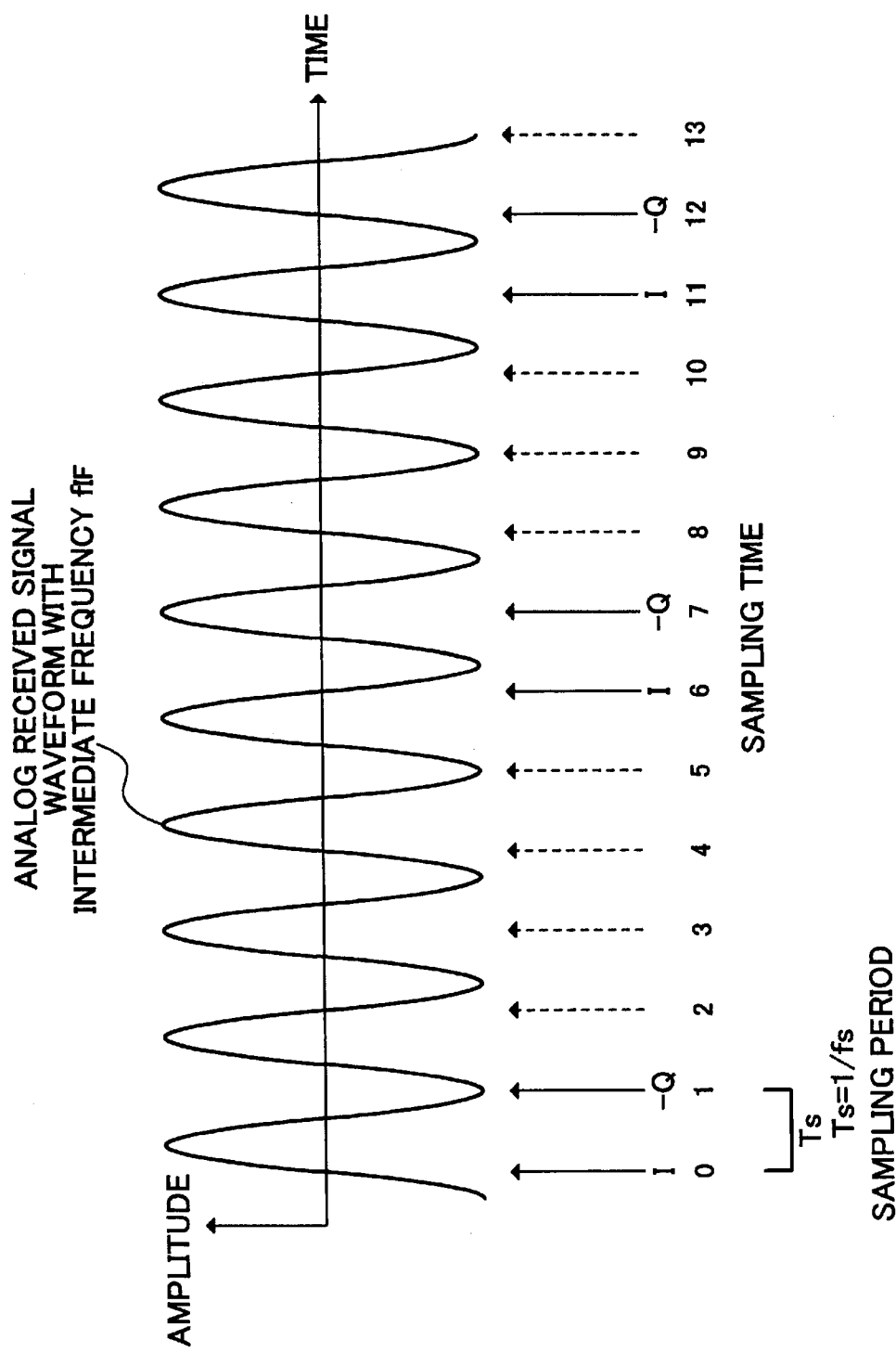
FIG. 17 is a second diagram to explain a method of generating an I signal and Q signal in an IQ generating section in the azimuth estimating apparatus in the sixth embodiment of the present invention.

The following explains about the specific method of generating the I signal and Q signal in IQ generating section 701 in this embodiment, using FIGS. 16 and 17. In each of FIGS. 16 and 17, an abscissa is indicative of time, an ordinate is indicative of amplitude, and Ts is indicative of sampling period.

As illustrated in FIG. 16, when a sampling frequency $f_s$ that clock generating section 104 generates is set to be 4 times the intermediate frequency $f_{IF}$, a phase difference between successive two sampling points (for example, 2 and 3) is 90°. Therefore a received complex digital signal is obtained by setting a timewise former signal to be an I signal, and further setting a timewise latter signal to be a Q signal at the two successive sample points.

Further as illustrated in FIG. 17, when the sampling frequency $f_s$ that clock generating section 104 generates is set to be 4/3 times the intermediate frequency $f_{IF}$, a phase difference between successive two sampling points (for example, 0 and 1) is 270°. Therefore a received complex digital signal is obtained by setting a timewise former signal to be an I signal, and further setting a timewise latter signal to be a -Q signal (which has an inverted polarity, i.e., a polarity-inverted Q signal) at the two successive sample points.

The phase relationships between successive two sampling points as illustrated in FIGS. 16 and 17 are always maintained not depending on sampling points, whereby IQ generating section 701 is capable of generating the I signals and Q signals intermittently and aperiodically.

In addition since the sampling period is set to be lower in the case of FIG. 17 than that of FIG. 16, it is possible to fetch the received complex digital signals more accurately, and to further improve accuracy in direction of arrival estimating processing, in the case of FIG. 17.

Further while FIGS. 16 and 17 explain the cases that the sampling frequency $f_s$ is 4 times the intermediate frequency $f_{IF}$, and that the $f_s$ is 4/3 times the $f_{IF}$, the present invention may obtain I signals and Q signals in a similar way to this embodiment by setting the sampling frequency $f_s$ to be 4N times or 4N/3 times the intermediate frequency $f_{IF}$, and using two values in a sampling period of (N−1) (N is a natural number).

In addition when in direction estimating section 105, the direction of arrival estimating processing is performed with software operating on an OS using a PC, a time required for signal processing is indefinite, whereby it is not possible to set intervals to fetch a received signal from an array antenna to be constant.

In contrast to this, in this embodiment, IQ signal generating section 701 is capable of generating I signals and Q signals intermittently and aperiodically. Therefore when direction estimating section 105 instructs IQ generating section 701 to output the I signal and Q signal at the time computation in the signal processing is completed, it is possible to generate complex digital signals aperiodically, and to perform the direction of arrival estimating processing independently of the time required for the signal processing.

Further by the use of a method obtained by combining the subspace-based method such as the MUSIC method as a direction of arrival estimating algorithm, and a TQR-SDV method excellent in adaptation property, direction estimating section 105 is capable of updating a direction of arrival estimated result of a received signal sequentially every time a pair of the I signal and Q signal is obtained. Therefore it is possible to perform fast and highly accurate estimation adaptable to rapid changes in direction of arrival of a radio signal in the mobile communication environment.

(Seventh Embodiment)

Figure 18:
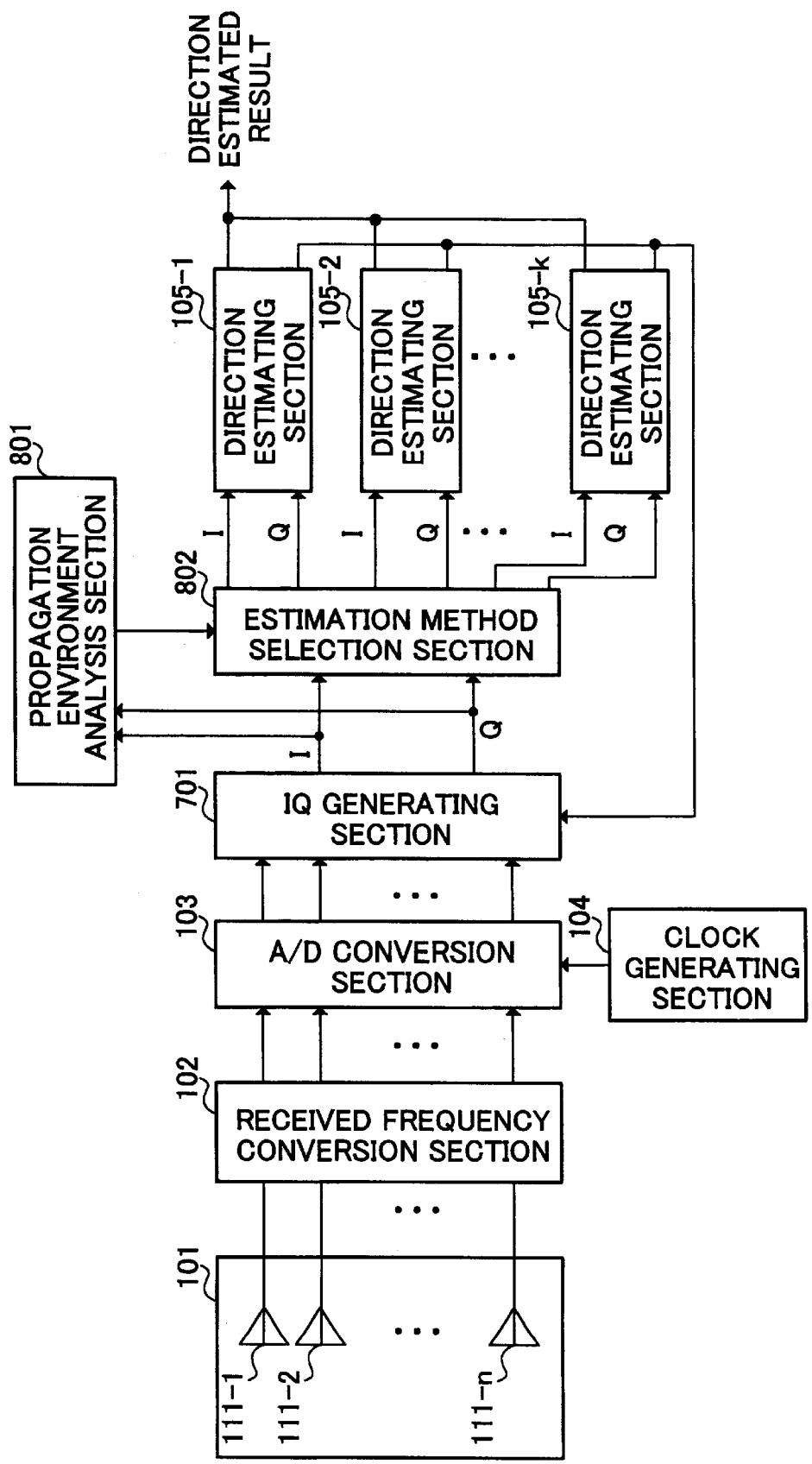
FIG. 18 is a block diagram illustrating a configuration of an azimuth estimating apparatus in a seventh embodiment of the present invention.

FIG. 18 is a block diagram illustrating a configuration of a direction estimating apparatus in the seventh embodiment of the present invention. In addition in the direction estimating apparatus illustrated in FIG. 18, sections common to those in the direction estimating apparatus illustrated in FIG. 15 are assigned the same marks as those in FIG. 15, and explanations thereof are omitted.

The direction estimating apparatus illustrated in FIG. 18 has propagation environment analysis section 801, and estimation method selecting section 802 in addition to the configuration of the direction estimating apparatus illustrated in FIG. 15, and further has k (k is a natural number equal to or more than 2) direction estimating sections 105-1 to 105-k.

Propagation environment analysis section 801 measures respective levels of an I signal and Q signal output from IQ generating section 701, and based on variations in the respective levels, analyzes the propagation environment. Then propagation environment analysis section 801 outputs a signal indicative of a result analyzed from the propagation environment to estimation method selecting section 802.

Estimation method selecting section 802 outputs the I signal and Q signal output from IQ generating section 701 to either of direction estimating sections 105-1 to 105-k, in order to enable the direction of arrival to be estimated with an optimal algorithm corresponding to the propagation environment.

Direction estimating sections 105-1 to 105-k each estimates a direction of arrival of a received signal using an algorithm different from each other, using the I signal and Q signal output from estimation method selecting section 802.

By thus preparing a plurality of direction estimating sections 105-1 to 105-k each estimating a direction of arrival of a received signal with an algorithm different from each other, and by analyzing the propagation environment based on variations in levels of the I signal and Q signal, it is possible to estimate the direction of arrival with an optimal algorithm corresponding to the propagation environment.

(Eighth Embodiment)

The eighth embodiment explains about a directivity controlling antenna apparatus which is provided with a direction estimating apparatus according to claim 6, and which performs directional combining in reception using direction estimated results obtained in direction estimating section 105.

Figure 19:
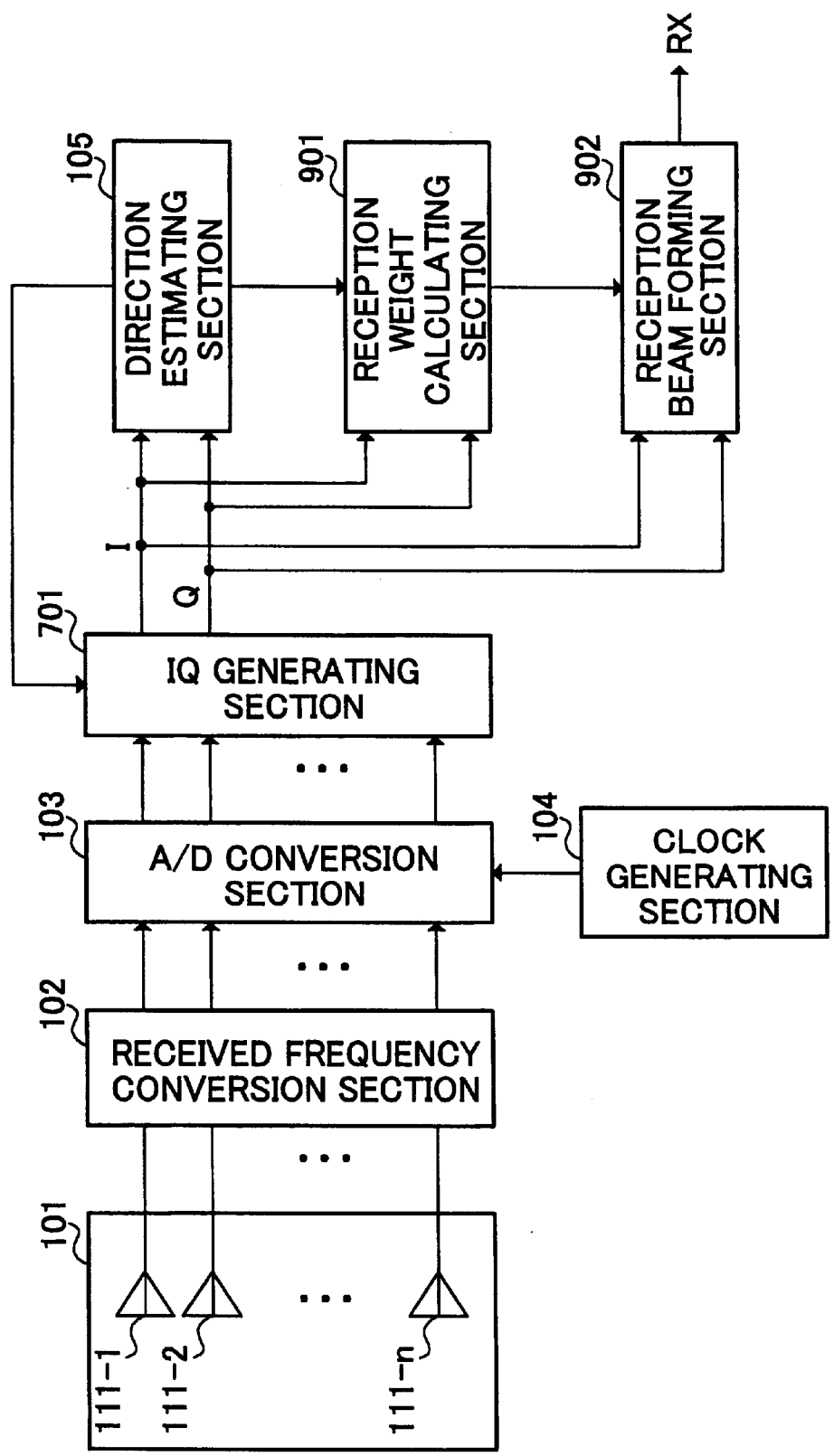
FIG. 19 is a diagram illustrating a configuration of a directivity controlling antenna apparatus in an eighth embodiment of the present invention.

FIG. 19 is a block diagram illustrating a configuration of the directivity controlling antenna apparatus in this embodiment. In addition in the directivity controlling antenna apparatus illustrated in FIG. 19, sections common to those in the direction estimating apparatus illustrated in FIG. 15 are assigned the same marks as those in FIG. 15, and explanations thereof are omitted.

The directivity controlling antenna apparatus illustrated in FIG. 19 has reception weight calculating section 901 and reception beam forming section 902 in addition to the configuration of the direction estimating apparatus illustrated in FIG. 15.

Reception weight calculating section 901 obtains reception weights to control an amplitude and phase of a received signal at each array element of array antenna 101, using an I signal and Q signal output from IQ generating section 701 and the direction estimated results output from direction estimating section 105.

Reception beam forming section 902 performs directional combining for array antenna 101 on the I signal and Q signal output from IQ generating section 701 using the reception weights, and outputs a desired received digital signal RX.

Figure 20:
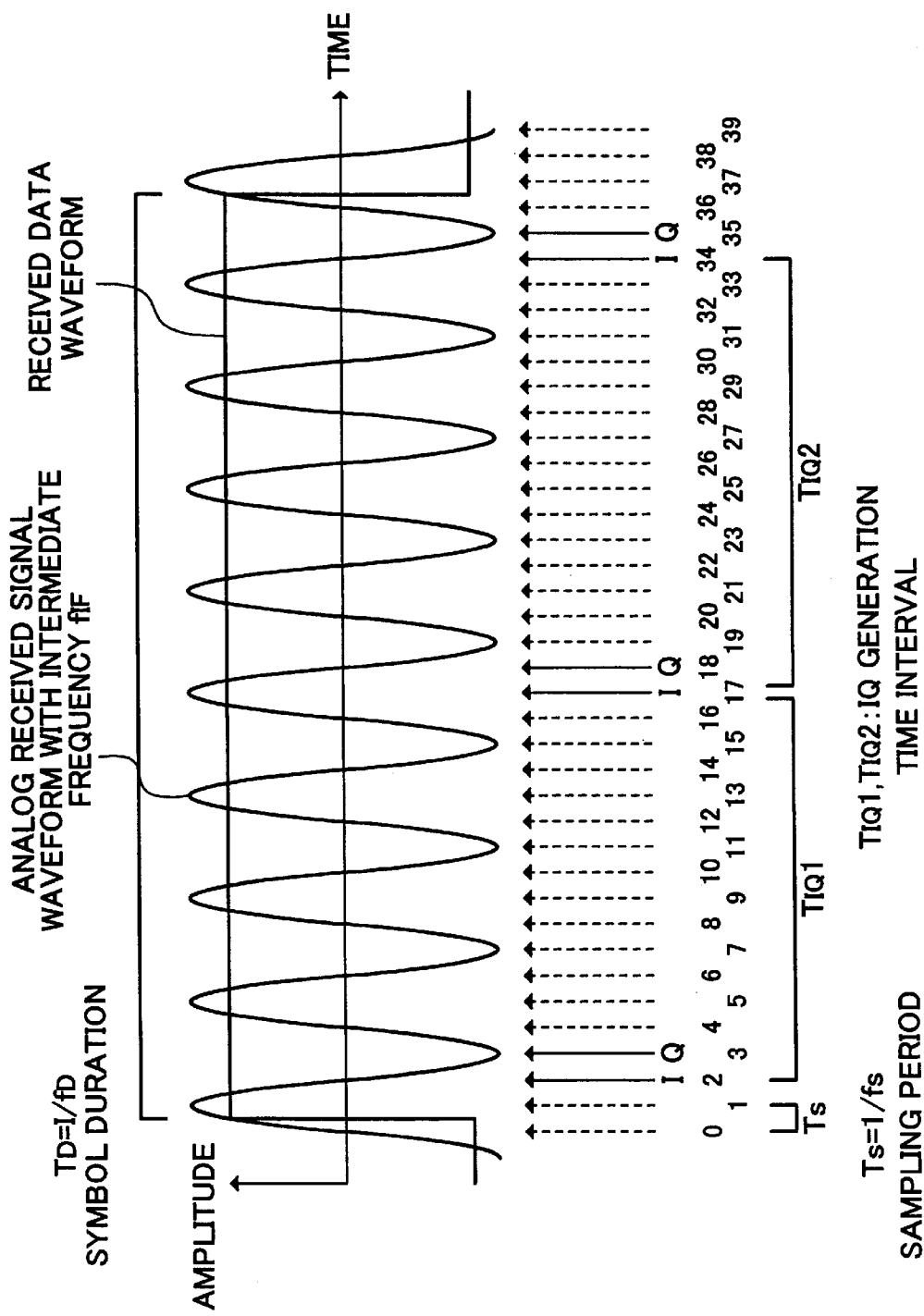
FIG. 20 is a diagram to explain a method of generating an I signal and Q signal in an IQ generating section in the azimuth estimating apparatus in the eighth embodiment of the present invention.

The following explains about a specific method of generating the I signal and Q signal in IQ generating section 701 in this embodiment, using FIG. 20. In FIG. 20, an abscissa is indicative of time, an ordinate is indicative of amplitude, and Ts is indicative of sampling period.

In this embodiment, a sampling frequency $f_S$ is set to be sufficiently higher than a symbol frequency $f_D$ of a received signal in A/D conversion section 103. Thereby as illustrated in FIG. 20, it is possible to set time intervals ($T_{IQ}1$, $T_{IQ}2$, ...) between the I signals and the Q signals generated in IQ generating section 701 to be shorter than a symbol duration, whereby demodulation processing in reception can be performed using the I signal and Q signal.

At this point, it is possible to improve reception sensitivity by controlling a radiation pattern so that a peak thereof is formed in the direction of a desired signal, and a null thereof is formed in the direction of an interfering signal.

(Ninth Embodiment)

The ninth embodiment explains about a directivity controlling antenna apparatus which is provided with a direction estimating apparatus according to the sixth embodiment, and which performs directional combining in transmission and reception using direction estimated results obtained in direction estimating section 105.

Figure 21:
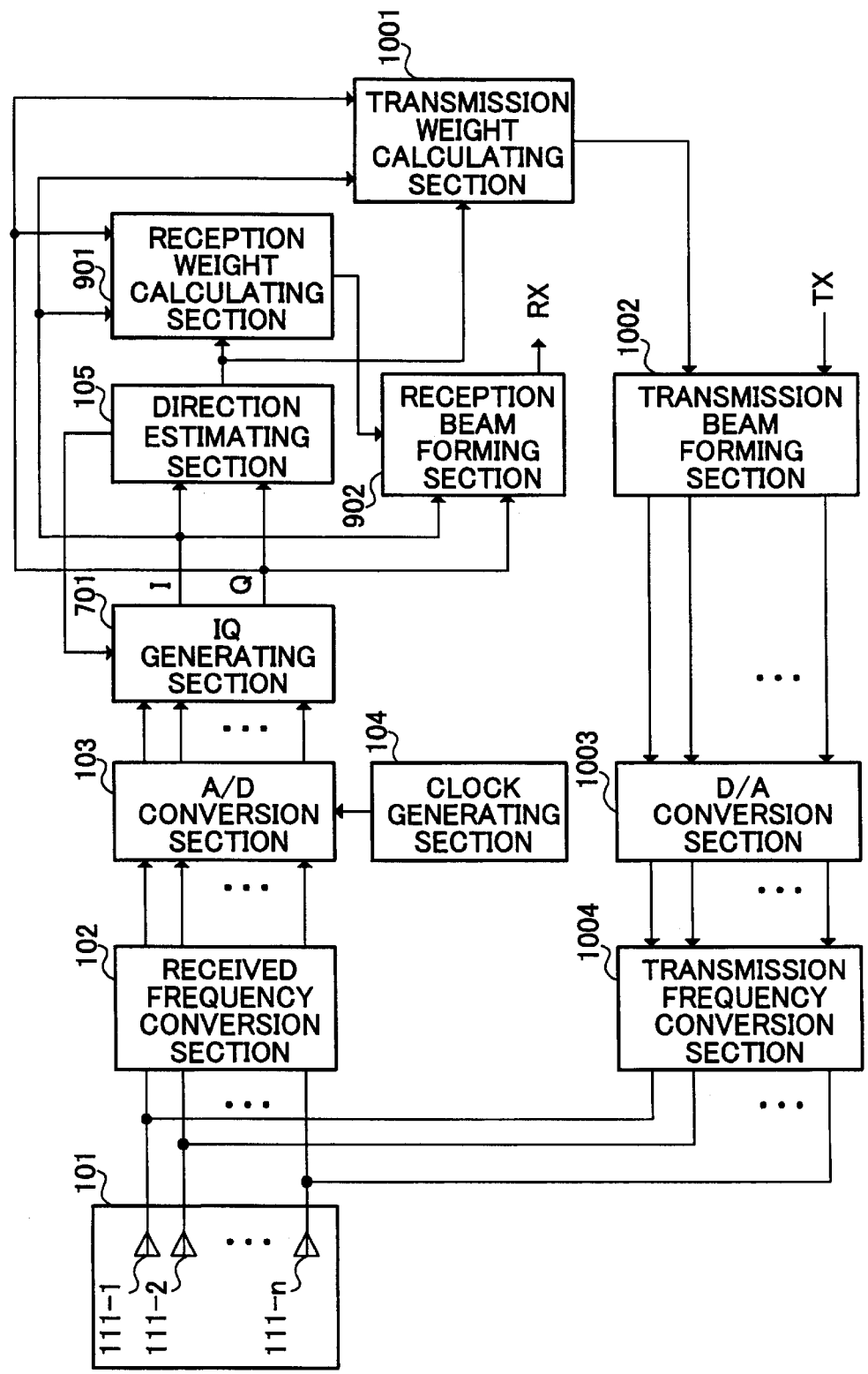
FIG. 21 is a first block diagram illustrating a configuration of a directivity controlling antenna apparatus in a ninth embodiment of the present invention.

FIG. 21 is a block diagram illustrating a first configuration of the directivity controlling antenna apparatus according to this embodiment. In addition in the directivity controlling antenna apparatus illustrated in FIG. 21, sections common to those in the directivity controlling apparatus illustrated in FIG. 19 are assigned the same marks as those in FIG. 19, and explanations thereof are omitted.

The directivity controlling antenna apparatus illustrated in FIG. 21 has transmission weight calculating section 1001, transmission beam forming section 1002, D/A conversion section 1003 and transmission frequency conversion section 1004 in addition to the configuration of the directivity controlling antenna apparatus illustrated in FIG. 19.

Transmission weight calculating section 1001 obtains transmission weights to control an amplitude and phase of a signal to be transmitted from each array element of array antenna 101, using an I signal and Q signal output from IQ generating section 701 and the direction estimated results output from direction estimating section 105.

Transmission beam forming section 1002 performs directivity control of array antenna 101 on transmission digital signals using the transmission weights.

In this case, it is possible to improve communication qualities by controlling a radiation pattern so that a peak thereof is formed in the direction of a desired signal, and a null thereof is formed in the direction of an interfering signal.

D/A conversion section 1003 converts an output signal from transmission beam forming section 1002 into an analog transmission intermediate frequency signal or baseband signal. Transmission frequency conversion section 1004 converts the intermediate frequency signal or baseband signal output from D/A conversion section 403 into a radio frequency signal, and the resultant radio signal is transmitted from the array antenna.

Figure 22:
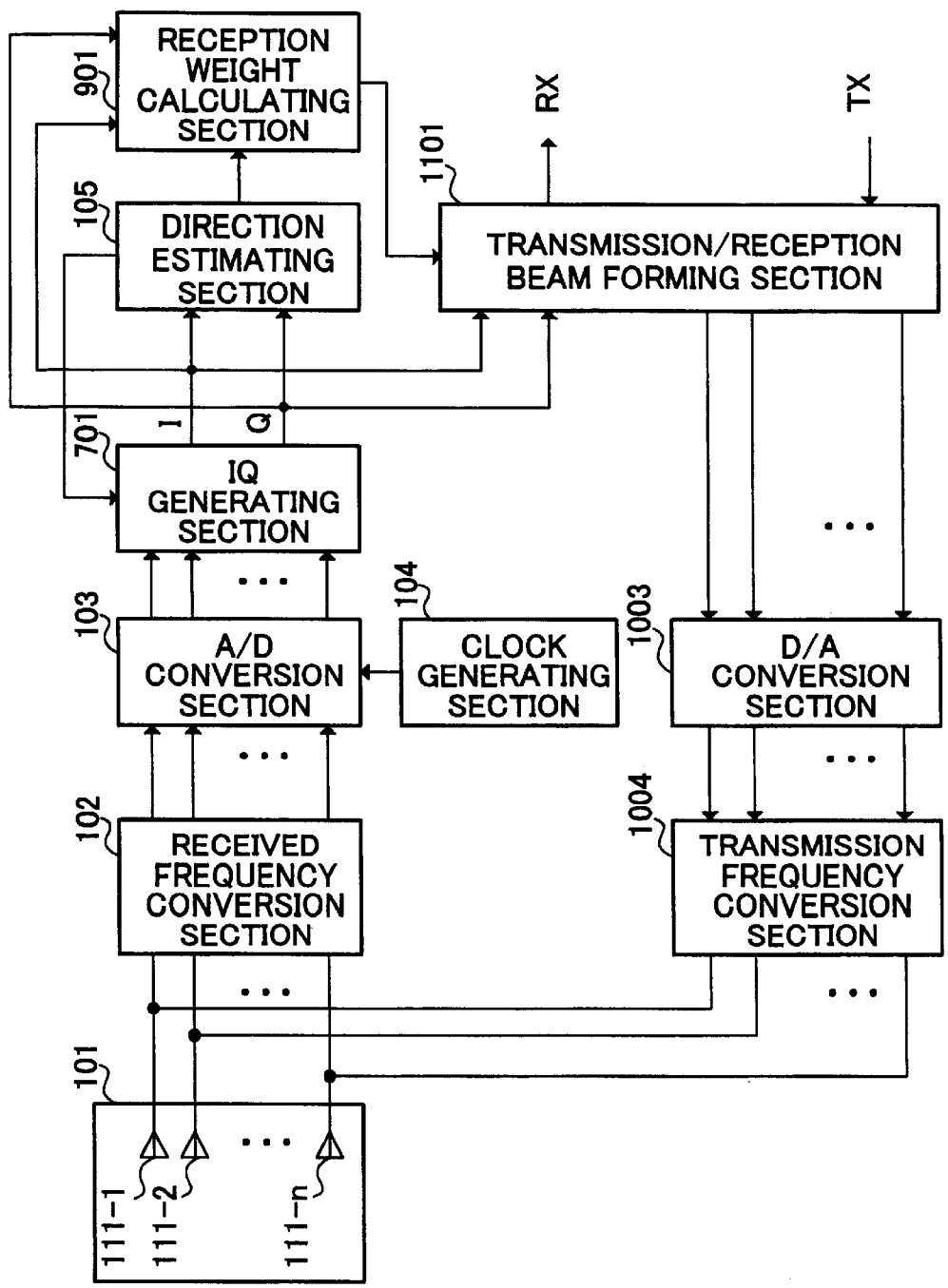
FIG. 22 is a second block diagram illustrating a configuration of another directivity controlling antenna apparatus in the ninth embodiment of the present invention.

Further as illustrated in FIG. 22, it may be possible that a directivity controlling antenna apparatus is provided with transmission/reception beam forming section 1101 that operates as reception beam forming section 902 and transmission beam forming section 1002. In this case, transmission/reception beam forming section 1101 performs directional combining for array antenna 101 on the I signal and Q signal output from IQ generating section 701 using reception weights, and outputs a desired received digital signal. Further transmission/reception beam forming section 1101 performs directivity control of array antenna 101 on transmission digital signals using the reception weights. This configuration does not require transmission weight calculating section 1001, whereby it is possible to reduce a computation amount and miniaturize the apparatus.

Figure 23:
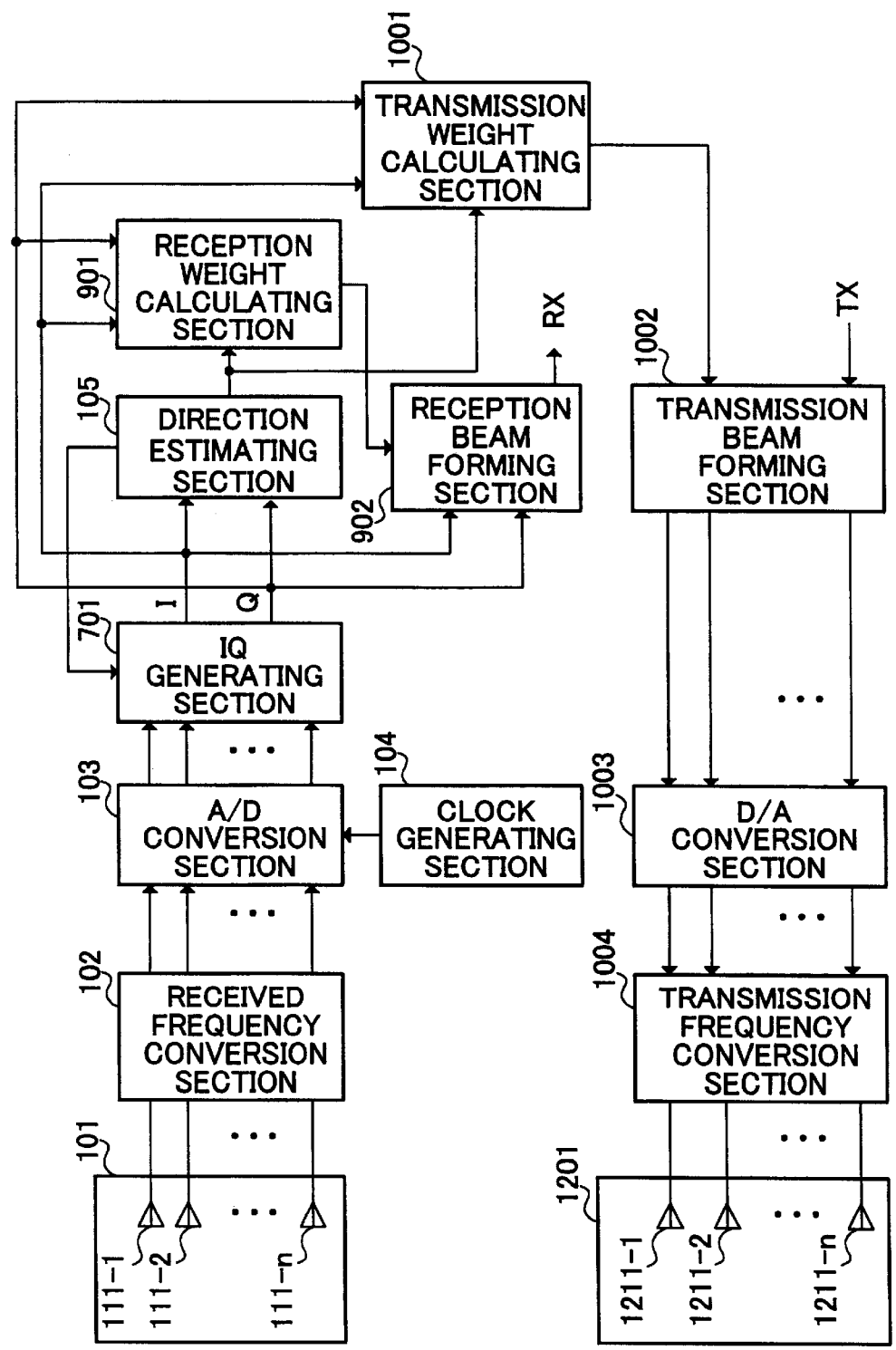
FIG. 23 is a third block diagram illustrating a configuration of the other directivity controlling antenna apparatus in the ninth embodiment of the present invention.

Furthermore as illustrated in FIG. 23, it may be possible that a directivity controlling antenna apparatus is provided with transmission array antenna 1201 comprised of m array elements 1211-1 to 1211-m separately from array antenna 101 comprised of n(n<m) array elements, so that transmission array antenna 601 transmits a radio frequency signal Output from transmission frequency conversion section 1104. In this case, since it is possible to sharpen a radiation beam pattern in the direction of a desired signal in transmitting the signal, it is possible to reduce power consumption at a reception-side apparatus.

According to the present invention as explained above, by arranging array elements of an array antenna at respective heights different from each other from a ground so as not to overlap to each other in the vertical direction, it is possible to improve direction estimation accuracy in the vertical direction and resolution as compared to the case that the array elements are arranged in the form of a circle on the same plane. Further it is possible to calculate a position of a transmission source by using the estimated results, and furthermore to obtain effects such as improved communication qualities and reduced power consumption by controlling the directivity of the array antenna.

The present invention is not limited to the above described embodiments, and various variations and modifications may be possible without departing from the scope of the present invention.

This application is based on the Japanese Patent Application No. HEI11-236732 filed on Aug. 24 1999 and the Japanese Patent Application No.2000-242961 filed on Aug. 10, 2000, entire content of which is expressly incorporated by reference herein.

What is claimed is:

1. A direction estimating apparatus comprising:
   an array antenna comprising a plurality of antennas as array elements, the array elements being arranged at respective different heights such that the array elements do not overlap in a vertical direction;
   a received frequency conversion system that converts a radio frequency signal of an arriving radio signal received at each of the array elements into an analog output signal, the analog output signal comprising one of an intermediate frequency signal and a baseband signal;
   an A/D conversion system that converts the analog output signal from the received frequency conversion system into a digital signal; and
   a direction estimating system that estimates a horizontal direction and a vertical direction of the arriving radio signal based on the digital signal output from the A/D conversion system.

2. The direction estimating apparatus according to claim 1, wherein each of the array elements of the array antenna is arranged on a helix.

3. The direction estimating apparatus according to claim 2, wherein each of the array elements of the array antenna is arranged so that neighboring array elements are arranged at equal intervals on a horizontal plane.

4. The direction estimating apparatus according to claim 2, wherein each of the array elements of the array antenna is arranged so that intervals between neighboring array elements are ununiform on a horizontal plane.

5. The direction estimating apparatus according to claim 1, further comprising:
   a position calculating system that calculates a position of a transmission source of the arriving radio signal based on the horizontal direction and the vertical direction of the arriving radio signal estimated in the direction estimating system.

6. A directivity controlling antenna apparatus comprising:
   a first array antenna comprising a plurality of antennas as array elements, the array elements being arranged at respective different heights from a ground so as not to overlap each other in a vertical direction;
   a received frequency conversion system that converts a radio frequency signal of an arriving radio signal received at each of the array elements into an analog output signal, the analog output signal comprising one of an intermediate frequency signal and a baseband signal;
   an A/D conversion system that converts the analog output signal from the received frequency conversion system into a digital signal;
   a direction estimating system that estimates a horizontal direction and a vertical direction of the arriving radio signal using the digital signal output from the A/D conversion system;
   a reception weight calculating system that obtains a reception weight based on the digital signal and on the horizontal direction and the vertical direction of the arriving radio signal estimated in the direction estimating system.

7. The directivity controlling antenna apparatus according to claim 6, further comprising:
   a transmission weight calculating system that obtains a transmission weight based on the digital signal and on the horizontal direction and the vertical direction of the arriving radio signal;
   a transmission beam forming system that performs weighting on a transmission digital signal using the transmission weight obtained in the transmission weight calculating system;
   a D/A conversion system that converts the weighted transmission digital signal into an analog signal; and
   a transmission frequency conversion system that converts one of an intermediate frequency signal and a baseband signal output from the D/A conversion system into a radio frequency signal to transmit.

8. The directivity controlling antenna apparatus according to claim 6, further comprising:
   a reception beam forming system that performs weighting on a transmission digital signal using a reception weight;
   a D/A conversion system that converts the weighted transmission digital signal into an analog signal; and
   a transmission frequency conversion system that converts an intermediate frequency signal and a baseband signal output from the D/A conversion system into a radio frequency signal transmit.

9. The directivity controlling antenna apparatus according to claim 7, further comprising:
   a second array antenna comprising array elements, a number of which is larger than a number of array elements of the first array antenna;
   wherein the transmission frequency conversion system transmits the radio frequency signal from the second array antenna.

10. A direction estimating apparatus comprising:
    an array antenna comprising a plurality of antennas as array elements, the array elements being arranged at respective different heights from a ground such that the array elements do not overlap in a vertical direction;
    a received frequency conversion system that converts a radio frequency signal of an arriving radio signal received at each of the array elements into an analog output signal, the analog output signal comprising one of an intermediate frequency signal and a baseband signal;
    an A/D conversion system that converts the analog output signal from the received frequency conversion system into a digital signal; and
    an IQ generating system that generates an in-phase component signal and a quadrature component signal intermittently and aperiodically from the digital signal output from the A/D conversion system; and
    a direction estimating system that estimates a horizontal direction and a vertical direction of the arriving radio signal based on the in-phase component signal and the quadrature component signal output from the IQ generating system.

11. The direction estimating apparatus according to claim 10, wherein the A/D conversion system converts the analog signal output from the received frequency conversion system into the digital signal using a sampling frequency 4N times an intermediate frequency, where N is a natural number, and the IQ generating system sets two successive sampled signals at sampling intervals of (N−1) to be the in-phase component signal and the quadrature component signal.

12. The direction estimating apparatus according to claim 10, wherein the A/D conversion system converts the analog signal output from the received frequency conversion system into the digital signal using a sampling frequency 4N/3 times an intermediate frequency, where N is a natural number, and the IQ generating system sets two successive sampled signals at sampling intervals of (N−1) to be the in-phase component signal and a polarity-inverted quadrature component signal.

13. The direction estimating apparatus according to claim 10, wherein the direction estimating system updates estimated results of the horizontal direction and the vertical direction of the arriving radio signal every time the IQ generating system generates a pair of the in-phase component signal and the quadrature component signal.

14. The direction estimating apparatus according to claim 10, further comprising:
    a propagation environment analysis system that measures respective levels of the in-phase component signal and the quadrature component signal, and based on variations in the respective levels, analyzes a propagation environment; and
    an estimation method selecting system that selects an optimal direction of arrival estimating algorithm corresponding to the propagation environment analyzed in the propagation environment analysis system;
    wherein the direction estimating system estimates the horizontal direction and the vertical direction of the arriving radio signal using the direction of an arrival estimating algorithm selected in the estimation method selecting system.

15. A directivity controlling antenna apparatus comprising:
    a third array antenna comprising a plurality of antennas as array elements;
    a received frequency conversion system that converts a radio frequency signal received at each of the array elements into one of an intermediate frequency signal and a baseband signal;
    an A/D conversion system that converts an analog signal output from the received frequency conversion system into a digital signal;
    an IQ generating system that generates an in-phase component signal and a quadrature component signal intermittently and aperiodically from the digital signal output from A/D conversion system;
    a direction estimating system that estimates a horizontal direction and a vertical direction of an arriving radio signal using the in-phase component signal and the quadrature component signal output from the IQ generating system;
    a reception weight calculating system that obtains a reception weight based on the horizontal direction and the vertical direction of the arriving radio signal estimated in the direction estimating system and the digital signal; and
    a reception beam forming system that performs directional combining for the third array antenna using the reception weight obtained in the reception weight calculating system.

16. A direction estimating method, comprising:

arranging a plurality of antennas of an array antenna at respective different heights from a ground so as not to overlap to each other in a vertical direction; and estimating a horizontal direction and a vertical direction of an arriving radio signal using a signal received at each of the plurality of antennas.

17. A direction estimating apparatus comprising:

an array antenna using a plurality of antennas as array elements;

a received frequency conversion system that converts a radio frequency signal received at each of the array elements into one of an intermediate frequency signal and a baseband signal;

an A/D conversion system that converts an analog output signal output from the received frequency conversion system into a digital signal;

an IQ generating system that generates an in-phase component signal and a quadrature component signal intermittently and aperiodically from the digital signal output from the A/D conversion system; and a direction estimating system that estimates a horizontal direction and a vertical direction of an arriving radio signal using the in-phase component signal and the quadrature component signal output from the IQ generating system.

* * * * *